(12) United States Patent
Vankamamidi et al.

(10) Patent No.: US 12,182,421 B1
(45) Date of Patent: Dec. 31, 2024

(54) TECHNIQUES FOR EXTENDING A WRITE CACHE

(71) Applicant: Dell Products L.P., Hopkinton, MA (US)

(72) Inventors: Vamsi K. Vankamamidi, Hopkinton, MA (US); Geng Han, Beijing (CN); Vikram A. Prabhakar, Apex, NC (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/447,496

(22) Filed: Aug. 10, 2023

(51) Int. Cl.
*G06F 3/06* (2006.01)

(52) U.S. Cl.
CPC .......... *G06F 3/0619* (2013.01); *G06F 3/0641* (2013.01); *G06F 3/0644* (2013.01); *G06F 3/065* (2013.01); *G06F 3/0683* (2013.01)

(58) Field of Classification Search
CPC .... G06F 3/0619; G06F 3/0641; G06F 3/0644; G06F 3/065; G06F 3/0683
See application file for complete search history.

(56) References Cited

U.S. PATENT DOCUMENTS

| | | | | |
|---|---|---|---|---|
| 7,793,061 B1 * | 9/2010 | Gupta | ................ | G06F 11/1441 711/119 |
| 9,026,765 B1 * | 5/2015 | Marshak | ................ | G06F 3/061 711/170 |
| 11,327,895 B1 | 5/2022 | Vankamamidi et al. | | |

* cited by examiner

*Primary Examiner* — Khoa D Doan
*Assistant Examiner* — Tong B. Vo
(74) *Attorney, Agent, or Firm* — Muirhead and Saturnelli, LLC

(57) ABSTRACT

In at least one embodiment, processing can include: receiving write operations; persistently recording, in a write cache or log, the write operations using page descriptors (PDESCs) of a PDESC pool and page buffers (PBs) of a PB pool; selecting, in accordance with criteria, write data pages stored in the PB pool for demotion to a physical large block (PLB) pool included in backend non-volatile storage, wherein each write data page selected denotes content written by a corresponding one of the write operations; responsive to the selecting, persistently storing the write data pages of the PB pool in the PLB pool; and updating PDESCs associated with the write data pages to reference corresponding storage locations in the PLB pool rather than in the PB pool.

20 Claims, 16 Drawing Sheets

TECHNIQUES FOR EXTENDING A WRITE CACHE

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: receiving a first set of write operations; persistently recording, in a write cache or log, the first set of write operations, wherein said recording each write operation of the first set includes persistently recording information describing said each write operation in a corresponding page descriptor (PDESC) of a PDESC pool and persistently storing a corresponding write data page written by said each write operation in a corresponding page buffer (PB) of a PB pool; selecting, in accordance with one or more criteria, a first plurality of write data pages stored in a first plurality of PBs of the PB pool for demotion to a first physical large block (PLB) of a PLB pool of non-volatile storage included in a storage tier of backend (BE) non-volatile storage, wherein each of the write data pages of the first plurality of write data pages selected denotes content written by a corresponding one of a first plurality of write operations of the first set; responsive to said selecting, persistently storing the first plurality of write data pages from the first plurality of PBs of the PB pool in the first PLB; and updating a first plurality of PDESCs associated with the first plurality of write data pages of the first plurality of write operations to reference corresponding storage locations in the first PLB rather than the first plurality of PBs.

In at least one embodiment, the steps of selecting, persistently storing and updating can be included in demotion processing performed responsive to detecting an occurrence of a trigger condition that triggers performance of said demotion processing. The trigger condition can specify to perform said demotion processing when a current utilization of PBs of the PB pool is above a specified threshold, or when a current level of free PBs of the PB pool is below a specified threshold. The demotion processing can be repeated a plurality of times to demote content of PBs of the PB pool to PLBs of the PLB pool until a stop condition is met. The stop condition can indicate to repeatedly perform said demotion processing until the current utilization of PBs of the PB pool is below a specified target level. The stop condition can indicate to repeatedly perform said demotion processing until the current level of free PBs of the PB pool is above a specified target level.

In at least one embodiment, the one or more criteria can include a criterion that indicates to select for demotion from the PB pool to the PLB pool a set of write data pages stored in PBs of the PB pool, wherein each write data page of the set of write data pages can correspond to unreplicated write data of a storage object on a first system configured for replication to a second system. The storage object can be any of a logical device, volume, file system, or file. The storage object can be configured for asynchronous replication. The storage object can be configured for semi-synchronous replication denoting a mode of asynchronous replication with a recovery point objective (RPO) less than a specified minimum.

In at least one embodiment, processing can include: replicating the set of write data pages demoted to the PLB pool; and responsive to said replicating, performing processing including: reclaiming one or more PLBs of the PLB pool storing the set of write data pages replicated; and reclaiming PDESCs associated with the set of write data pages replicated by said replicating.

In at least one embodiment, the one or more criteria can include a criterion that indicates to select for demotion from the PB pool to the PLB pool a set of write data pages stored in PBs of the PB pool, wherein each write data page of the set of write data pages can correspond to write hot data associated with a corresponding target logical address that is overwritten at a frequency exceeding a specified threshold. Processing can include: performing a write folding optimization of recorded write operations of the write cache or log. The write folding optimization can include: determining that a first write data page of the set corresponds to first content stored at a first logical address that is overwritten with second content of a second data page of the set; and responsive to said determining that a first write data page of the set corresponds to first content stored at a first logical address that is overwritten with second content of a second data page of the set, reclaiming a first storage location in the PLB pool, wherein the first write data page that is overwritten is stored at the first storage location in the PLB pool.

In at least one embodiment, the PDESC pool and the PB pool can be included in first non-volatile storage of the write cache or log, and wherein the PLB pool can be included in an extension of the write cache or log included in the storage tier of BE non-volatile storage. The storage tier of BE non-volatile storage including the PLB pool can have a first write latency that is greater than a second write latency of the first non-volatile storage including the PDESC pool and the PB pool.

In at least one embodiment, processing can include marking the first plurality of PBs as free and available for reuse subsequent to said persistently storing the first plurality of write data pages from the first plurality of PBs of the PB pool in the first PLB.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION OF EMBODIMENT(S)

Figure 1:
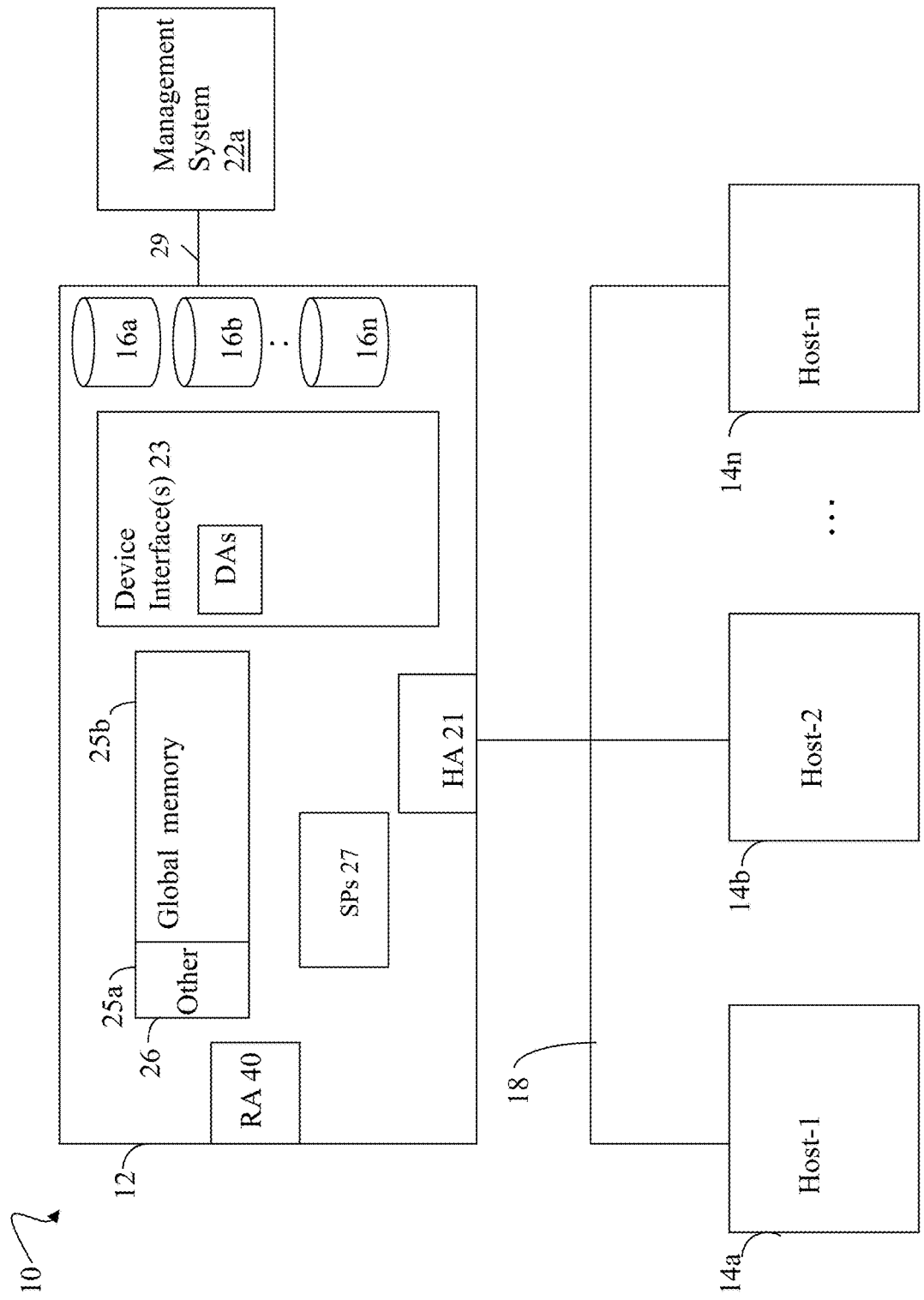
FIG. 1 is an example of components that may be included in a system in accordance with the techniques of the present disclosure.

A system such as a data storage system can be a log-based system where write, and possibly other operations, can be recorded persistently in a log. Subsequently, the recorded operations of the log can be flushed where the write data of the recorded writes of the log is written out to longer term non-volatile storage, such as provided by back-end (BE) non-volatile storage. The recorded operations of the log can include, for example, write operations that update stored user content or data. The recorded operations of the log can include other operations, for example, such as creating a snapshot, that can involve only metadata (MD) updates rather than actually updating or modifying stored user content or data.

The log can thus serve as a write cache or a persistent cache used for persistently recording writes and other operations. In some discussions and contexts herein, the log can also be referred to as a write cache or simply a cache that is persistent. In one system, the log or write cache can include a page descriptor (PDESC) tier and a page buffer (PB) tier, where both the PDESC tier and the PB tier are a form of non-volatile or persistent storage such as non-volatile random access memory (NVRAM). In one system, writes and other recorded operations of the log or write cache can be recorded using a PDESC of the PDESC tier, where the PDESC describes the write or other operation. For a write operation recorded in the log or write cache, a PDESC of the write cache can identify, for example, the target location or target logical address of the write operation and can include a pointer or address to a persistent storage location in a PB of the PB tier. The PB associated with the PDESC can store the content or data written by the write I/O described by the PDESC. In some systems, other operations recorded in the write cache or log that do not modify or write new user data or content can be recorded using a PDESC without an associated PB. The size of the NVRAM storage used for the write cache or log can thus be limited in size.

In at least one embodiment, the techniques of the present disclosure can be used to leverage BE PDs, such as SSDs providing BE non-volatile storage, to extend the write cache or log. In at least one embodiment, each node can have its own PDESC pool in the PDESC tier, PB pool in the PB tier and PLB (physical large block) pool in a PLB tier. In at least one embodiment, the PDESC pool and PB pool can be located on NVRAM or form of non-volatile persistent storage; and the PLB pool can reside on non-volatile BE PDs, such as on an SSD tier of non-volatile BE PDs.

In at least one embodiment in accordance with the techniques of the present disclosure, the log or write cache can be further effectively extended by aggregating multiple smaller portions or PBs of write data from the PB pool and then selectively demoting such PBs of data from the PB pool to the PLB pool of a node. In at least one embodiment, the PBs of the PB pool that can be selected for movement or demotion to the PLB pool can be in accordance with one or more specified selection criteria. For example, in at least one embodiment, the criteria can indicate to select for movement or demotion from the PB pool to the PLB pool PBs of write data characterized as write hot where the associated target storage location is frequently written to or overwritten. For example, a target logical address LA1 that has a write frequency exceeding a specified threshold within a specified period of time can be determined where the target logical address LA1 may have been written to by 3 separate write I/Os recorded in the write cache or log. A write folding optimization can be performed to result in only the latest or most recently recorded write I/O, W3, and its corresponding PB3 and PDESC3 being retained in the log or write cache, whereby LA1 can be classified as a write hot target location that is frequently overwritten and the PB3 storing the most recently written content of W3 can be classified as a write hot page of data or content. Assuming W3 writes content C3 to LA1, C3 can be stored in PB3. The PB3 storing the most recently written content C3 of the latest overwrite W3 to the target logical address LA1 can be selected for movement or demoted to the PLB pool. As another example, the criteria in at least one embodiment can select PBs for demotion or movement to the PLB pool which contain write data waiting to be replicated from a source system such as in connection with the semi-sync replication feature described herein. For the semi-sync use case, the subsequent pages or PBs of write data of an unconfirmed transient snapshot can be held in the write cache or log until all such PBs of write data have been replicated to the target system. In at least one embodiment, the criteria can indicate that the PBs containing the unreplicated content or write data of the subsequent writes (subsequent to an unconfirmed transient snapshot) can be selected for movement or demoted to the PLB pool. Thus generally the one or more criteria, some examples of which are noted above and elsewhere herein, can be used to specify, at least in part, candidate PBs that can be selected from the PB pool for demotion or movement from a PB pool to a PLB pool. In at least one embodiment, the PLBs of the PLB pool including content or data of such demoted PBs can be viewed as further extending the persistent log or write cache of a system. In at least one embodiment, the PLBs storing content of the demoted PBs can be referred to as an extension of the write cache or log, or the extended write cache or log.

In this manner in at least one embodiment, demoting selected pages of content or write data from PBs of a PB pool or tier to a PLB of a PLB pool or tier can be characterized as yet another way to effectively increase the size of the log or write cache. Multiple selected pages of PBs of a PB pool or tier can be aggregated together and demoted to a PLB of the PLB pool or tier. In at least one embodiment, the selected PBs can store write hot data or content frequently overwritten. In at least one embodiment, the selected PBs can store write data of a volume or LUN (or more generally a storage object) configured for semi-sync replication where the write data of the selected PBs of the source system has not yet been replicated from the source system to the target system. The demoted PBs now stored in a set of PLBs of a PLB pool can thus be retained in the write cache or log for a longer period of time whereby the set of PLBs can be included in the extended write cache or log. In at least one embodiment, demotion or movement of the pages of data from the PBs to the set of PLBs can be performed to increase the number of free PBs available for reuse. Once the PBs selected for movement or demotion have had their content or data stored in the set of PLBs, the selected PBs just demoted are now free and can be reused for storing write data or content of new subsequently received write I/Os. In at least one embodiment, the demotion or movement of content from PBs to PLBs can be performed to increase the number of free PBs and can be performed in at least one embodiment as an alternative to flushing the PDESCs and corresponding demoted PBs from the write cache or log. Put another way in at least one embodiment, rather than flush PBs from the PB pool to increase the number of free PBs, candidates PBs can be selected for movement or demotion to PLBs of the write cache or log extension.

The foregoing and other aspects of the techniques of the present disclosure are described in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2A:
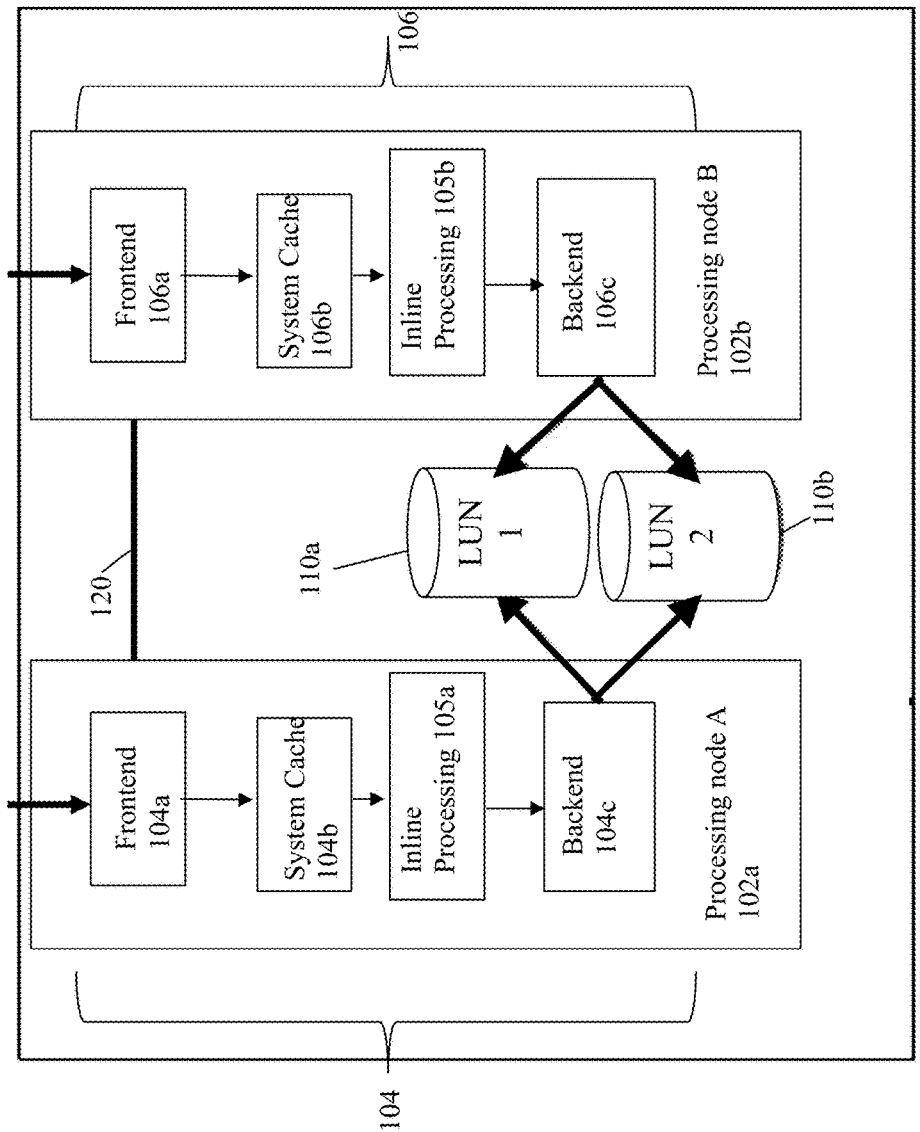
FIG. 2A is an example illustrating the I/O path or data path in connection with processing data in at least one embodiment in accordance with the techniques of the present disclosure.

With reference to the FIG. 2A, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path. In at least one embodiment, data deduplication processing can include performed processing to detect duplicate data portions such that only a single unique instance of content is stored and where there can be multiple references such as by multiple logical addresses to the single unique instance stored on persistently on BE non-volatile storage of the data storage system.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes, or more generally I/Os, directed to the LUNs 110a, 110b can be received for processing by either of the nodes 102a and 102b, the example 100 illustrates what can also be referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2A is an internal network interconnect 120 between the nodes 102a, 102b. In at least one embodiment, the interconnect 120 can be used for internode communication between the nodes 102a, 102b.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102a-b in the FIG. 2A. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein in at least one embodiment, a log or journal can serve as a write cache used for caching write operations such as write I/Os as well as other write commands or requests. In at least one embodiment, such other write commands or requests can include, for example, offload copy operations such as xcopy that perform copy or write operations internal within the data storage system or appliance to copy data from a source to a target location, where the source (including the write data) and target (denoting the target location where the write data is copied to) can both be in the system or appliance and other cached information. In at least one embodiment, other operations that can be recorded in the log can include snapshot commands or operations to create a snapshot of a storage object, such as a LUN.

In at least one embodiment, the log used for caching logged writes and other operations can be implemented using non-volatile storage, such as NVRAM (non-volatile random access memory) devices that can be external with respect to both of the nodes or storage controllers. The storage devices used to implement the log can be form a non-volatile cache accessible to both nodes of the dual node architecture. In at least one embodiment where the log devices such as NVRAM storage devices are external with respect to the two nodes, the log devices can be in addition to other non-volatile PDs or devices accessible to both nodes. The additional other non-volatile PDs can provide, for example, the BE non-volatile storage for the nodes where the cached or logged data can be eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2A, for write operations, latency can be affected by the amount of time taken to store the write data in the log where the write data is visible to both nodes or controllers of the system.

Consistent with other discussion herein, the log file used to log user operations, such as write I/Os, can be used to optimize write operation latency. Generally, a write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein.

The mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 3:
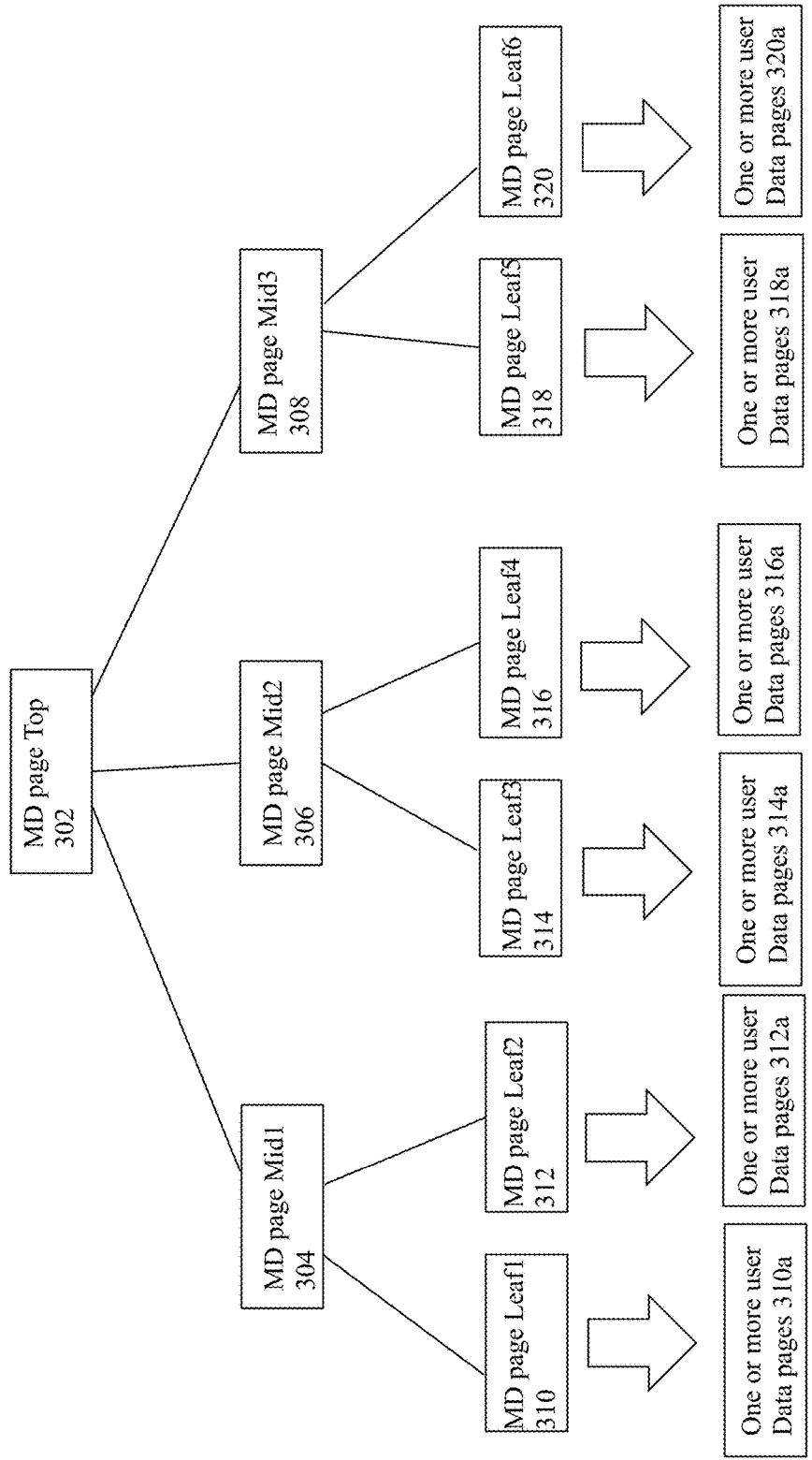
FIGS. 3, 4, 5 and 6 are examples illustrating metadata pages of mapping information in at least one embodiment in accordance with the techniques of the present disclosure.

In at least one embodiment, the mapping information or MD structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 3 as including only 3 levels where each node in the tree can have at most 3 child nodes. Generally, the techniques herein can be used with any layered or hierarchical structure of MD pages.

What will now be described are further details in connection with using a log for logging user or client operations, such as write I/Os or more generally write or update operations in at least one embodiment in accordance with the techniques of the present disclosure.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 2B:
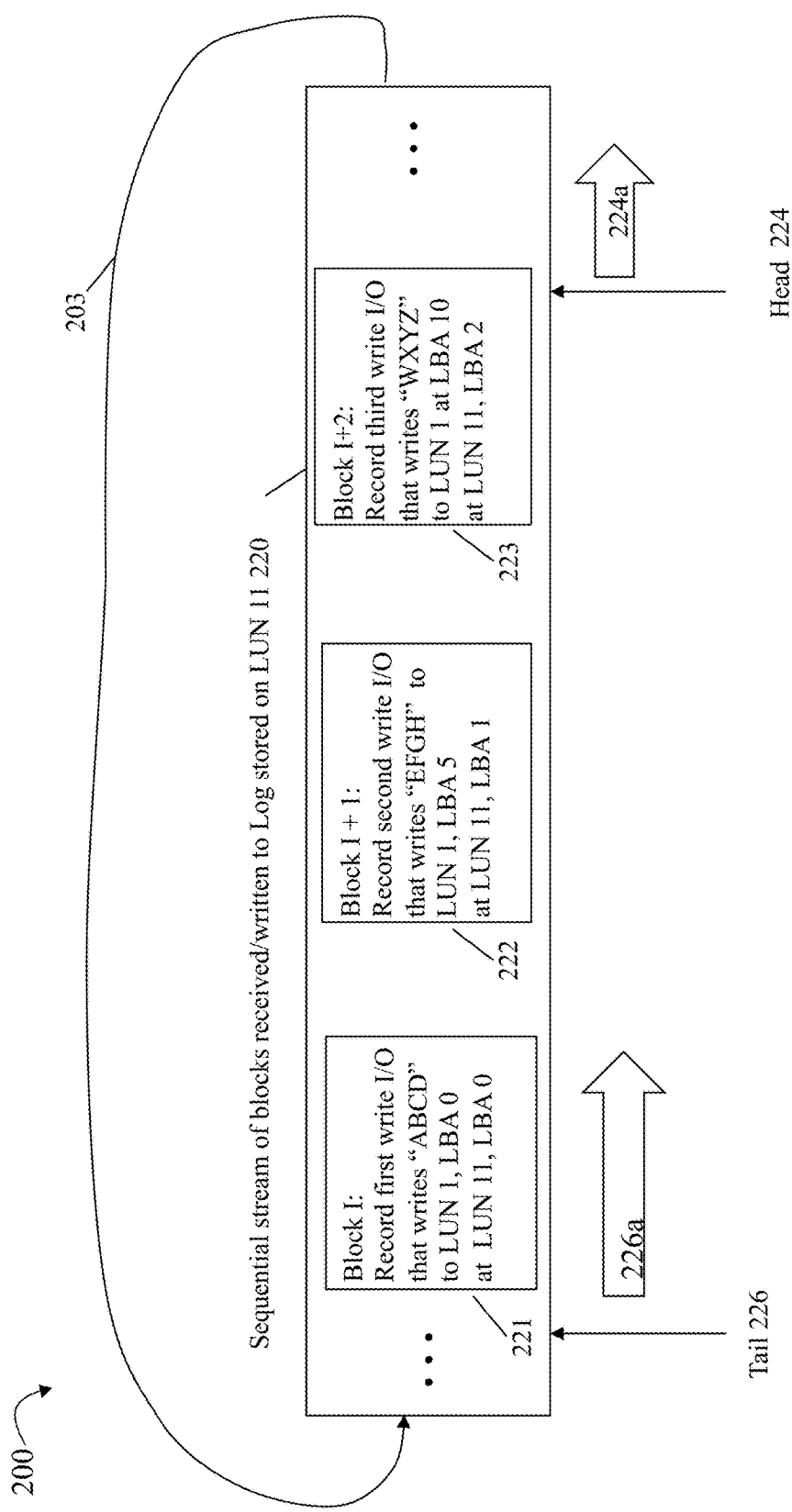
FIGS. 2B, 2C and 2D are examples illustrating use of a log or journal recording client operations in at least one embodiment in accordance with the techniques of the present disclosure.

Referring to FIG. 2B, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 2B, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226*a* sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 2C:
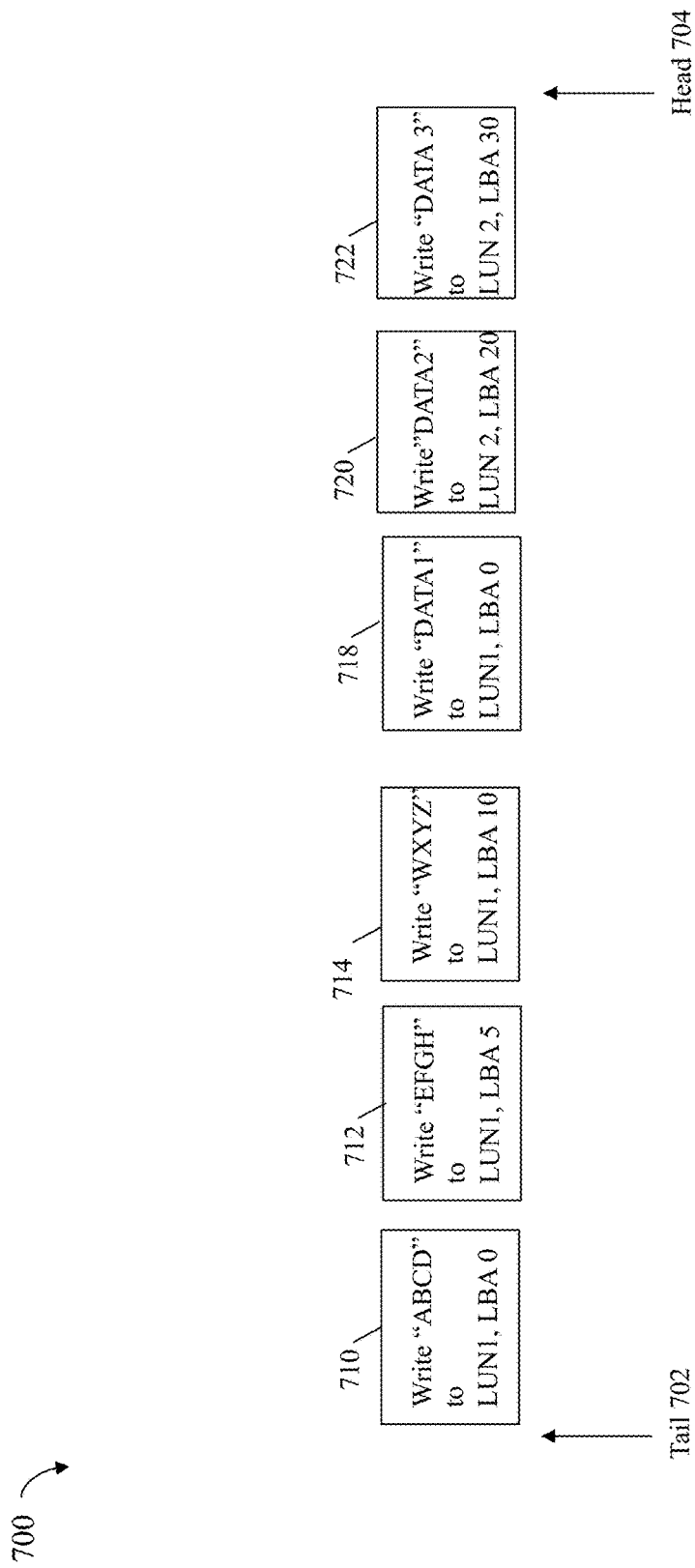

Referring to FIG. 2C, shown is an example of information that can be included in a log, such as a log of user or client write operations, in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 2C, the log records 710, 712, 714, 718, 720 and 722 can also record the write data (e.g., write I/O operation payload) written by the write operations. It should be noted that the log records 710, 712 and 714 of FIG. 2C correspond respectively to the log records 221, 222 and 223 of FIG. 2B.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 2D:
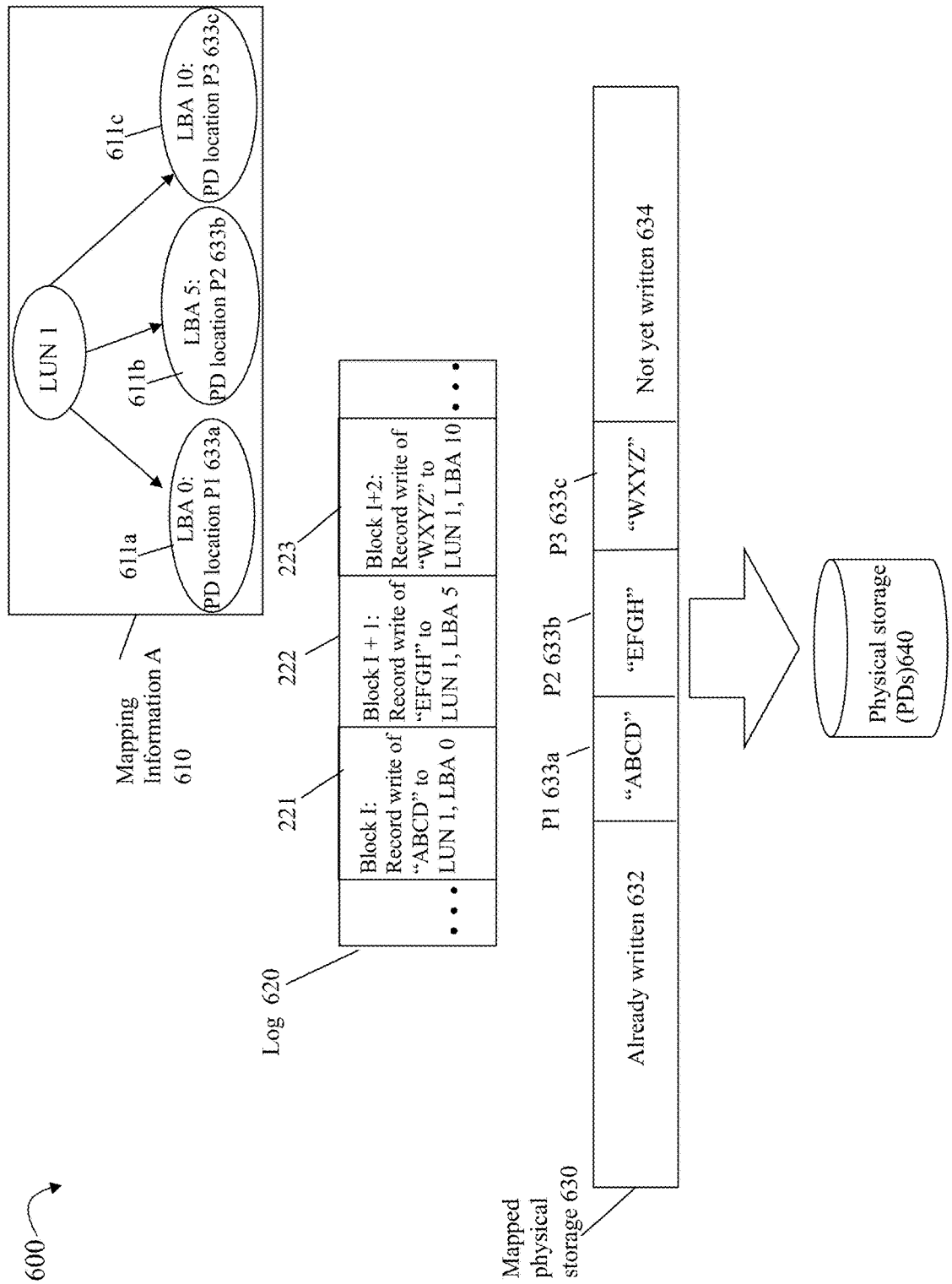

Referring to FIG. 2D, shown is an example 600 illustrating the flushing of logged writes and the physical data layout of user data on BE PDs in at least one embodiment in accordance with the techniques of the present disclosure. FIG. 2D includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611*a-c* denoting the mapping information, respectively, for the 3 target logical address of the 3 recorded write I/O operations in the log records 221, 222, and 223. The element 611 a of the mapping information denotes the mapping information for the target logical address LUN1, LBA 0 of the block 221 of the log 620. In particular, the block 221 and mapping information 611*a* indicate that the user data "ABCD" written to LUN 1, LBA 0 is stored at the physical location (PD location) P1 633*a* on the physical storage 640. The element 611*b* of the mapping information denotes the mapping information for the target logical address LUN1, LBA 5 of the block 222 of the log 620. In particular, the block 222 and mapping information 611*b* indicate that the user data "EFGH" written to LUN 1, LBA 5 is stored at the physical location (PD location) P2 633*b* on the physical storage 640. The element 611*c* of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633*c* on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 2B) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633*a*, 633*b*, 633*c* and 634. The element 632 denotes the physical locations of the user data written and stored on the BE PDs for the log records processed prior to the block or record 221. The element 633*a* denotes the PD location P1 of the user data "ABCD" stored at LUN 1, LBA 1. The element 633*b* denotes the PD location P2 of the user data "EFGH" stored at LUN 1, LBA 5. The element 633*c* denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the user data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630.

Consistent with other discussion herein, the mapped physical storage 630 can correspond to the BE PDs providing BE non-volatile storage used for persistently storing user data as well as metadata, such as the mapping information. With a log-structured system as discussed herein in at least one embodiment, as recorded writes in the log are processed, the data written by the writes can be written to new physical storage locations on the BE PDs.

Referring to FIG. 3, shown is an example 300 of a tree of MD pages that can be used in an embodiment in accordance with the techniques herein. The example 300 includes a tree of MD pages denoting the mapping structure as discussed above with 3 levels —a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310*a*, 312*a*, 314*a*, 316*a*, 318*a* and 320*a*.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312*a*. In order to access UD page X of 312*a*, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310*a*, 312*a*, 314*a*, 316*a*, 318*a* and 320*a* include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 3, the data pages 310*a*, 312*a*, 314*a*, 316*a*, 318*a* and 320 each include user data stored on particular logical addresses of the LUN A's logical address space. It may be, for example, that element 310*a* includes user data stored at a first set of LBAs 0-511; and that element 312*a* includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310*a* denotes data pages for LBAs 0-511; the element 312*a* denotes data pages for the LBAs 512-1023; the element 314*a* denotes data pages for LBAs 1024-1535; the element 316*a* denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310a denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310a.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 4:
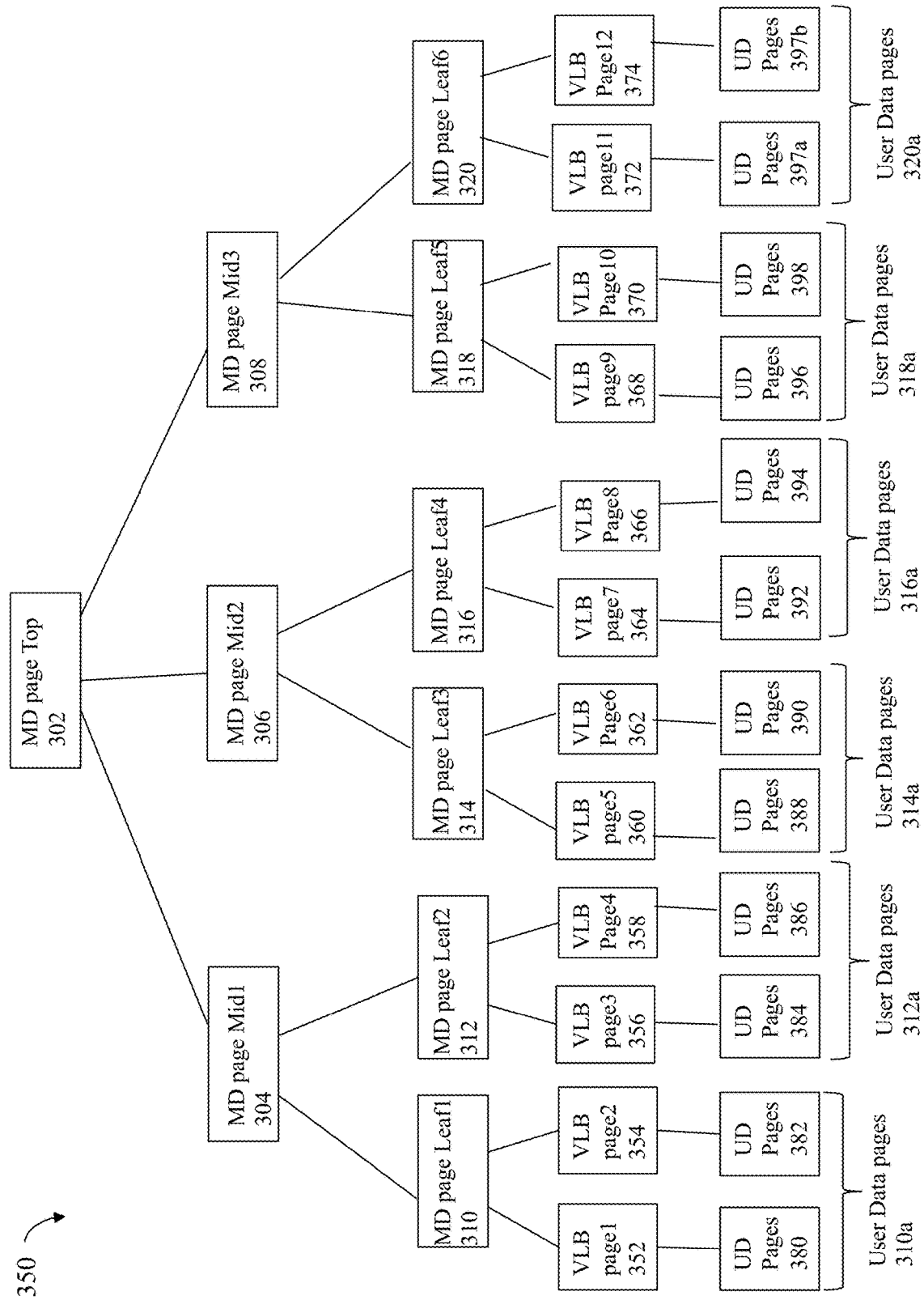

Referring to FIG. 4, shown is a more detailed version of a hierarchical structure used as the mapping structure 108 that can be used in an embodiment in accordance with the techniques of the present disclosure. The structure 350 is similar to the structure 300 as described and illustrated in FIG. 3 with the added difference that more detail is provided regarding the intervening layer of a VLB (virtualization layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages—MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310a of FIG. 3 including data for LBAs 0-511. The UD pages 384 and 386 denote two portions of UD pages corresponding to UD pages 312a of FIG. 3 including data for LBAs 512-1023. The UD pages 388 and 390 denote two portions of UD pages corresponding to UD pages 314a of FIG. 3 including data for LBAs 1024-1535. The UD pages 392 and 394 denote two portions of UD pages corresponding to UD pages 316a of FIG. 3 including data for LBAs 1536-2047. The UD pages 396 and 398 denote two portions of UD pages corresponding to UD pages 318a of FIG. 3 including data for LBAs 2048-2559. The UD pages 397a and 397b denote two portions of UD pages corresponding to UD pages 320a of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
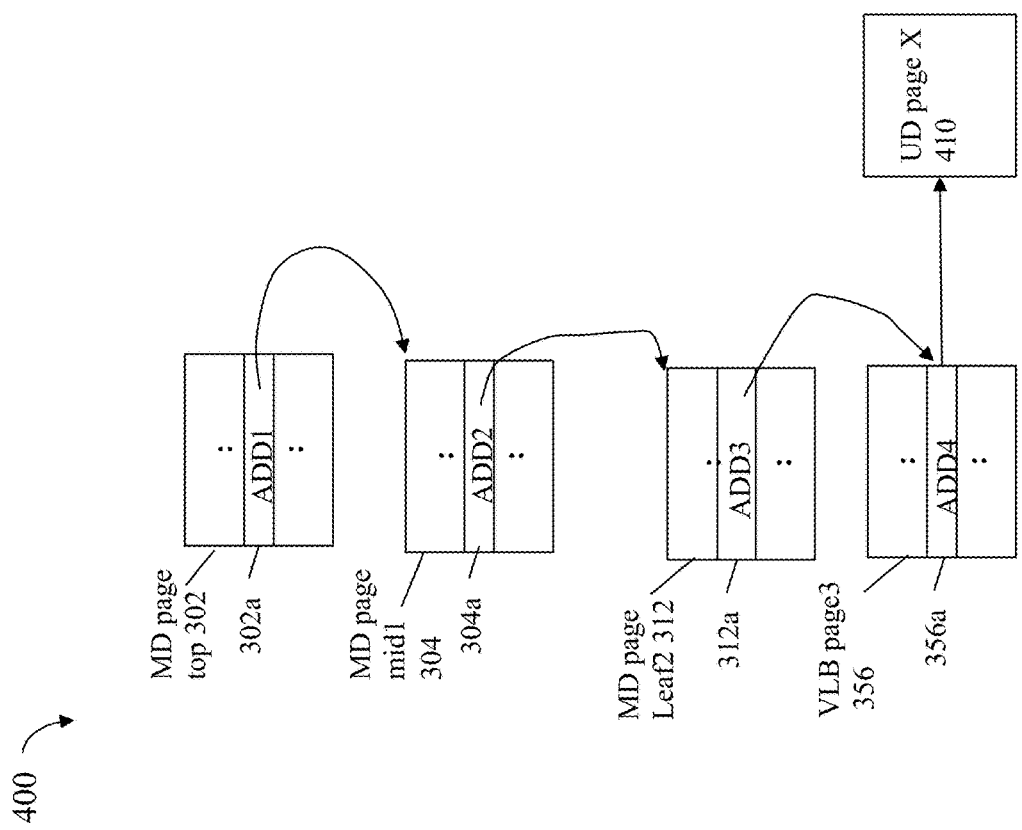

Referring to FIG. 5, shown is a more detailed representation 400 of the MD pages of the sequence traversed to access the UD page X 384 included in the set of UD pages 312a. As noted above, the MD page sequence includes MD page 302, MD page 304, MD page 312, and VLB page3 356. In the example 400, MD page top 302 includes an entry or address 302a that points to or references the MD page mid1 304. In at least one embodiment, the starting entry 302a in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302a having a pointer, address or reference to the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302a. If the MD page 302 is already in cache, the cached copy can be used to obtain the address or pointer ADD1 from the location 302a. The address or pointer ADD1 of location 302a can then be used to identify the particular mid level MD page, such as MD page mid1 304, that is accessed next in the sequence.

Continuing with the example 400, the MD page mid1 304 can be accessed where the location 304a is read to obtain the address or pointer ADD2 from location 304a. In at least one embodiment, the particular entry or offset 304a of the MD mid1 page can be determined based on the logical address being mapped. The address or pointer ADD2 can then be used to identify the particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304*a*. The address or pointer ADD2 identifies the MD page leaf 2 312. If the MD page 312 is not already in cache, the on-disk copy of the MD page 312 on a PD can be read to obtain the content of location 312*a*. In at least one embodiment, the particular desired entry or offset 312*a* of the MD leaf2 page 312 can be determined based on the logical address being mapped. The location 312*a* of the MD page leaf2 312 can be accessed and read to obtain the address or pointer ADD3 from location 312*a*. The address or pointer ADD3 can then be used to identify a particular entry of a VLB page, such as the entry 356*a* of the VLB page3 356, that is next accessed in the sequence. Thus, ADD3 can denote the location or address of the entry 356*a* in the VLB page 3 356.

If the VLB page 356 is not already in cache, the on-disk copy of the VLB page 356 on a PD can be read to obtain the content of location 356*a*. The location 356*a* of the VLB page 3 356 can be accessed and read to obtain the address or pointer ADD4 from the location 356*a*. The address or pointer ADD4 can then be used to identify the particular UD page X 410 where the UD page X can next be read. If the UD page X is not in cache, the on-disk copy of the UD page X can be read in from a PD.

The example 400 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

Figure 6:
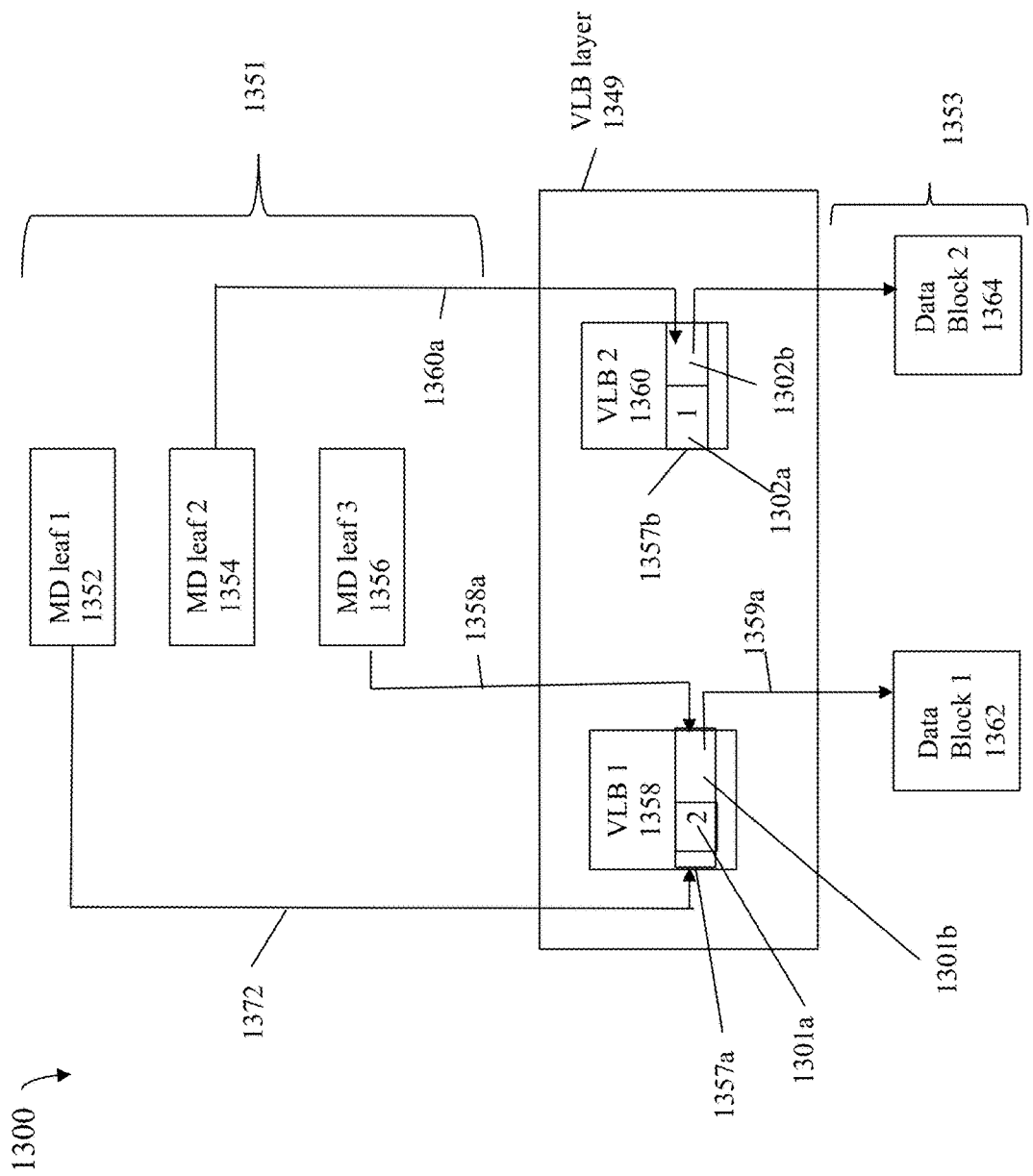

Referring to FIG. 6, shown is an example illustrating in more detail a particular embodiment in which a VLB layer of multiple VLBs is the intervening layer between the MD leaf nodes of the mapping structure 108 and the data blocks. The elements 1352, 1354 and 1356 can denote 3 MD leaf nodes included in a MD leaf layer of a MD mapping structure such as described herein (e.g., in FIGS. 3, 4 and 5). The elements 1358 and 1360 denote 2 VLBs included in the intervening VLB layer 1349 between MD leaf nodes 1351 and data blocks 1353. The elements 1362 and 1364 denote 2 data blocks each storing content such as user data stored at logical addresses. In the example 1300, the MD leaf nodes 1352 and 1356 both indirectly reference the same data block 1362 through the same entry 1357*a* of the VLB 1358. The two MD leaf nodes 1352 and 1356 both referencing the same data block 1362 indirectly through use of the same VLB entry 1357*a* can be a mapping resulting from data deduplication processing. In the example 1300, MD leaf node 1354 points to the entry 1357*b* of the VLB 1360 whereby the entry 1357*b* of the VLB2 1360 then further references or points to the data block 1364. The data blocks 1362, 1364 can denote user data blocks as described herein.

The element 1358*a* denotes a pointer to, or address of, the entry 1357*a* in the VLB 1358 used in connection with obtaining the data block 1362 stored on a particular LUN and LBA of the LUN. The pointer 1358*a* can be used as the virtual or indirect pointer in connection with obtaining the data block 1362. In at least one embodiment, the VLB 1358 can be a VLB page or node as described herein. Thus, in such an embodiment, the virtual or indirect pointer 1358*a* can be a pointer to the entry 1357*a* of the VLB structure 1358, where the entry 1357*a* can further include fields 1301*a* and 1301*b*. The field 1301*b* can be a pointer to, or address of, the user data block 1362. The field 1301*a* can be a reference count or counter indicating the number of instances of, or references to, the particular data block 1362 (e.g., data block pointed to by 1301*b*).

The element 1372 denotes a pointer to, or address of, the entry 1357*a* in the VLB 1358 used in connection with obtaining the data block 1362 stored on a particular LUN and LBA of the LUN. The pointer 1372 can be used as the virtual or indirect pointer in connection with obtaining the data block 1362. In at least one embodiment, the VLB 1358 can be a VLB page or node as described herein. Thus, in such an embodiment, the virtual or indirect pointer 1372 can be a pointer to the entry 1357*a* of the VLB structure 1358, where the entry 1357*a* can further include the fields 1301*a* and 1301*b*. The field 1301*b* can be a pointer to, or address of, the user data block 1362. The field 1301*a* can be a reference count or counter indicating the number of instances of, or references to, the particular data block 1362 (e.g., data block pointed to by 1301*b*).

The element 1360*a* denotes a pointer to, or address of, the entry 1357*b* in the VLB 1360 used in connection with obtaining the data block 1364 stored on a particular LUN and LBA of the LUN. The pointer 1360*a* can be used as the virtual or indirect pointer in connection with obtaining the data block 1364. Thus, in such an embodiment, the virtual or indirect pointer 1360*a* can be a pointer to the entry 1357*b* of the VLB structure 1360, where the entry 1357*b* can further include the fields 1302*a* and 1302*b*. The field 1302*b* can be a pointer to, or address of, the user data block 1364. The field 1302*a* can be a reference count or counter indicating the number of instances of, or references to, the particular data block 1362 (e.g., data block pointed to by 1302*b*).

The reference count 1301*a* can be initialized to 1 when a first or initial instance of the associated data block 1362 is stored. In this example, the reference 1301*a* is 2 indicating that there are 2 instances of the data block 1362 and thus 2 references to the data block 1362. In this case, the are 2 instances of the data block 1362 in stored user data. The instances denoted by the reference count 1301*a* include all deduplicated instances corresponding to entries of the MDL leaves 1352, 1356 that respectively point 1372, 1358*a* to the VLB entry 1357*a* associated with the single copy of the data block 1362.

The reference count 1302*a* can be initialized to 1 when a first or initial instance of the associated data block 1364 is stored. In this example, the reference 1302*a* is 1 indicating that there is 1 instance of the data block 1364 and thus 1 reference to the data block 1364. The instances denoted by the reference count 1302*a* generally include any/all deduplicated instances associated with the single copy of the data block 1364. However, in this example, there is only a single reference to, and single instance of, the data block 1364 in stored user data. In particular, the MD leaf 1354 references or points (1360*a*) to the VLB entry 1357*b* associated with the single copy of the data block 1364.

In at least one embodiment, each VLB can be a VLB page or node as described herein including multiple entries, such as 512 entries, where each such VLB entry can include one or more fields of information such as the address or pointer to one of the data blocks such as 1362 or 1364.

In at least one embodiment, each MD leaf can have multiple entries, such as 512 entries, each corresponding to a different logical address in a logical address range corresponding to the MD leaf.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 3-6.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 3-6.

In at least one embodiment, the MD or mapping information used in connection with stored user data can be stored on non-volatile storage, such as on the BE PDs of the appliance or data storage system. At least some of the MD pages of mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at new subsequent physical storage locations on the BE PDs. Additionally, the MD or mapping information corresponding to the logged writes being flushed can also be accordingly updated to reference the new subsequent physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 3-6.

In at least one embodiment, updates or modifications to the MD pages of the mapping structure described in connection with the FIGS. 3-6 can also similarly be recorded in entries or records of a persistently stored metadata log and then flushed or destaged from the metadata log to persistent BE storage of the BE PDs. In at least one embodiment, the MD pages of the MD or mapping structure such as described in connection with the FIGS. 3-6 can be persistently stored in a MD page store on the BE PDs of the system. In some contexts herein, the copy of a MD page as stored in the MD page store on the BE PDs can also be referred to herein as the on-disk copy of the MD page.

Consistent with other discussion herein, the log used for persistently recording write operations and other operations can be used as a write cache for such recorded operations. The other cached operations or information can include, for example, cached operations or commands such as create snapshot commands. In following paragraphs, the log can also be referred to as a write cache or cache that persistently stores recorded operations such as, for example, write operations and create snapshot commands.

Consistent with discussion herein, a system such as a data storage system can be a log-based system where writes and possibly other operations can be recorded persistently in a log. Subsequently, the recorded operations of the log can be flushed where the write data of the recorded writes of the log is written out to longer term non-volatile storage, such as provided by back-end (BE) non-volatile storage. The recorded operations of the log can include, for example, write operations that update stored user content or data. The recorded operations of the log can include other operations, for example, such as creating a snapshot, that can involve only metadata (MD) updates rather than actually updating or modifying stored user content or data.

The log can thus serve as a write cache or a persistent cache used for persistently recording writes and other operations. In some discussions and contexts herein, the log can also be referred to as a write cache or simply a cache that is persistent. In one system, the log or write cache can include a page descriptor (PDESC) tier and a page buffer (PB) tier, where both the PDESC tier and the PB tier are a form of non-volatile or persistent storage such as non-volatile random access memory (NVRAM). In one system, writes and other recorded operations of the log or write cache can be recorded using a PDESC of the PDESC tier, where the PDESC describes the write or other operation. For a write operation recorded in the log or write cache, a PDESC of the write cache can identify, for example, the target location or target logical address of the write operation and can include a pointer or address to a persistent storage location in a PB of the PB tier. The PB associated with the PDESC can store the content or data written by the write I/O described by the PDESC. In some systems, other operations recorded in the write cache or log that do not modify or write new user data or content can be recorded using a PDESC without an associated PB.

In one system, the PB tier can be implemented as a pool of PBs including a free list of free PBs available for allocation or use, and a used or allocated list of used or allocated PBs. Allocating a PB can include obtaining a free PB from the free list. Once an entry of the log or write cache is flushed, the entry's PB can be reclaimed by adding it to the free list.

In one system, the PDESC tier can be implemented using a ring-based structure that includes the PDESCs that are allocated to store recorded operations of the log or write cache. With a ring-based structure, the ring can be managed using a head pointer that points to the head of the ring, and a tail pointer that points to the tail of the ring. PDESCs can be allocated from the head of the ring. PDESCs can be reclaimed and reused by advancing the tail pointer. PDESCs cannot be allocated passed the tail. The tail can be advanced as PDESCs are flushed, and thus reclaimed and made available for reuse. However, PDESCs may not be flushed in the same sequential order in which they are allocated and the tail cannot be advanced passed a PDESC unless that PDESC has been flushed and is now available for reuse. Put another way, PDESCs can be flushed in an order that creates holes of flushed PDESCs (that can be reused or reclaimed) intermixed between other unflushed PDESCs (that cannot yet be reused or reclaimed). In such an arrangement, the tail cannot be advanced passed an unflushed PDESC such that other flushed PDESCs that are available for reuse but located beyond the unflushed PDESC cannot be reclaimed by tail movement. Thus PDESCs can be flushed in an order that promotes efficient flushing but that can result in PDESC reclamation inefficiencies due to the delays in advancing the tail. The flushing efficiency ordering of PDESCs can create holes or intermixing of flushed PDESCs between unflushed PDESCs as noted above which can delay tail advancement and thus can delay flushed PDESC reclamation and reuse.

To address the drawbacks of a PDESC tier that implements or manages PDESCs using a ring-based structure noted above, a pool-based approach can be used to enhance the efficiency of PDESC tier resource utilization and effectively increase the size of the log or write cache. Put another way, implementing the PDESC tier as a PDESC pool similar to the PB pool can effectively increase the size of the log or write cache due to the increased immediate PDESC reclamation. With the PDESC pool, PDESCs can be reclaimed and reused immediately upon flushing rather than having reclamation and reuse possibly delayed due to the delayed tail movement as noted above. As a result with a PDESC pool, PDESC utilization and efficiency can increase thereby effectively increasing the size of the log or write cache to accommodate additional recorded operations.

Allocated PDESCs in the PDESC pool which store recorded operations of the log or write cache can have an associated sequential time order denoted using sequence numbers or identifiers (IDs). In at least one embodiment, write order consistency can be maintained that corresponds to the order of increasing sequence numbers or IDs associated with PDESCs. In at least one embodiment, each PDESC (and thus each recorded operation in the write cache or log) can be assigned a unique sequence number of ID denoting the relative time order of the PDESC and its corresponding recorded operation with respect to other recorded PDESCs and corresponding recorded operations. In at least one embodiment, the sequence IDs can be monotonically increasing and correspond to the relative time order in which recorded operations are applied. In at least one embodiment, higher sequence IDs denote corresponding recorded operations occurring later in time subsequent to lower sequence IDs corresponding to other recorded operations. For example, a first recorded write I/O W1 with a sequence ID=N in a first corresponding PDESC occurs in time prior to a second recorded write I/O W2 with a sequence ID that is greater than N. In order to maintain write order integrity as well as general data integrity with respect to recorded operations, for example, W1 is applied prior to W2 in time order. Sequence numbers or IDs can be generated using any suitable technique. In at least one embodiment of a multi-node system, the techniques described in U.S. patent Ser. No. 11/327,895, Issued May 10, 2022, Protocol For Processing Requests That Assigns Each Request Received By A Node A Sequence Identifier, Stores Data Written By The Request In A Cache Page Block, Stores A Descriptor For The Request In A Cache Page Descriptor, And Returns A Completion Acknowledgement Of The Request, can be used to generate sequence numbers or IDs across multiple nodes in the system.

The PDESC pool approach provides the capability of purposefully delaying or holding the flush of some operations without incurring the adverse undesirable effects that would otherwise be incurred with the PDESC ring. In at least one embodiment, some innovative features can take advantage of the foregoing capability of purposefully delaying or holding the flushing of some recorded operations in the write cache or log.

In at least one embodiment, the expanded or effectively enlarged write cache can be used in connection with a semi-sync or semi-synchronous replication feature or mode which enables reducing the RPO or recovery point objective, for a replicated storage object such as a logical device to the level or granularity of seconds. An RPO can be defined as the maximum acceptable amount of data loss after an unplanned data-loss incident, expressed as an amount of time. Generally, a source LUN (e.g., logical device or volume), file system, file, or other storage object located on a first source storage system can be replicated to a corresponding target device on a second target storage system. A replication service can be used to continuously replicate updates or writes made to the source LUN of the source system to the corresponding target device on the target system where the target device can be used by storage clients in the event of a disaster or data loss of the source LUN on the source system. Generally, synchronous replication provides for maintaining the source device and its corresponding target device as mirrors such that a write from the host received at the source system is not acknowledged to the host until the write is committed to both the source and target devices. Alternatively, asynchronous replication provides for replicating writes made to the source device to the target device with some tolerable time lag or difference in accordance with the specified RPO. For example, an RPO for a logical device can be 10 minutes. With asynchronous replication, the writes to the source device can be acknowledged to the host once the write is committed to the source device and without requiring that the write also be committed to the target device. With asynchronous replication, the source system can generally send the replication writes to the target system at a sufficient rate or pace to meet the specified RPO. With semi-synch replication in at least one embodiment, the RPO in asynchronous replication can be very small such as 10 seconds rather than 10 minutes such that the asynchronous replication provides the replicate writes or updates at a much faster frequency to meet the 10 second RPO.

In at least one embodiment, a snapshot difference or snap diff technique can be used in connection with asynchronous replication generally, and in particular with the semi-sync replication feature, which is generally asynchronous replication with a very small RPO typically such as a number of seconds. The snap diff technique generally takes snapshot of the source LUN or object at a frequency that is less than the RPO. For example, if the RPO=10 seconds, successive snapshots of the source LUN can be taken at every 5 second interval. The data differences between two successive snapshots can be determined and can form the incremental data updates or writes replicated from the source system to the target system, where such replicated writes are committed and applied to the corresponding target LUN on the target system. In at least one embodiment, a PDESC without an associated PB can be stored in the write cache to record the operation of creating a snapshot at a point in time. In at least one embodiment each semi-sync snapshot can be designated as a transient snapshot that is used for replication. For each transient snapshot or transient snap corresponding to a semi-sync snapshot, a PDESC without a PB can be recorded in the write cache where the PDESC includes a special attribute of "transient". The transient attribute of the PDESC for the snapshot indicates that the snapshot is a replication snapshot that should be flushed and processed in a special manner that deviates from a regular non-transient or non-replication related snapshot. In at least one embodiment, a regular (non-replication related) snapshot recorded in the PDESC of the write cache can be flushed and can include performing processing that can include, for example, creating additional MD pages or mapping information for the snapshot of the source LUN. In contrast, the transient snapshot (e.g., replication related snapshot) with its corresponding transient snap PDESC does not need to have the associated MD pages or mapping information created since the replication-related transient snapshot can be used only internally within the data storage system for replication and is not exposed externally to storage clients. Put another way, the transient snapshot has a short transient life span and exists temporarily only for the purpose of asynchronous replication of data changes in connection with a snap diff. Thus in at least one embodiment, the transient snapshot can be maintained in the write cache or log and can be deleted after all subsequent writes prior to the next consecutive transient snapshot are replicated. A further example is provided in connection with FIG. 7 below.

Figure 7:
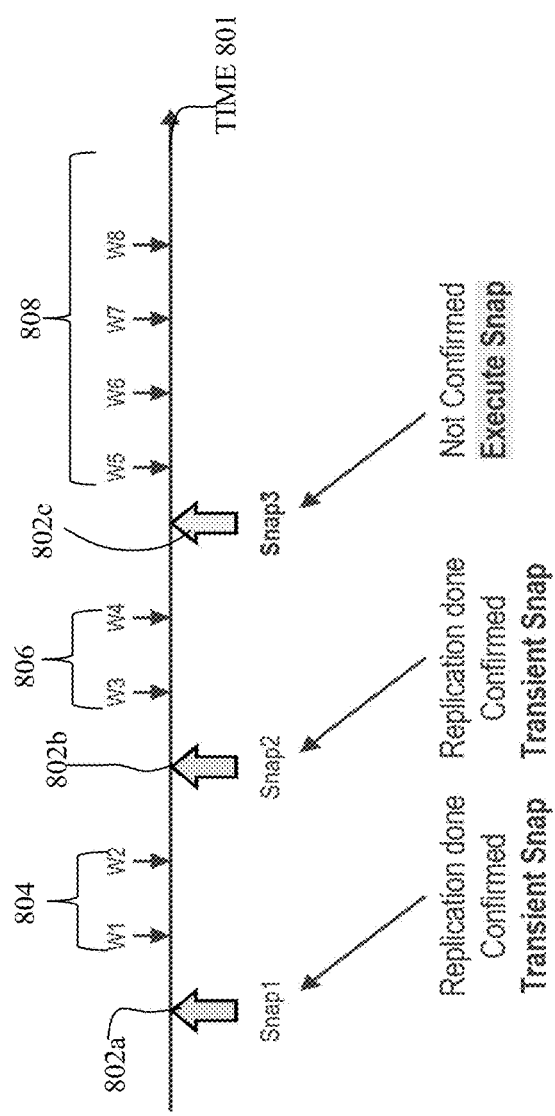
FIG. 7 is an example illustrating writes in connection with transient snapshots taken in connection with a storage object configured for a mode of asynchronous replication in at least one embodiment in accordance with the techniques of the present disclosure.

Referring to FIG. 7, shown is an example 800 illustrating use of transient snapshots in connection with asynchronous replication in at least one embodiment in accordance with the techniques of the present disclosure.

The example 800 illustrates 3 replication related snapshots 802a-c taken at various points in time along a timeline 801. The snapshot snap1 802a is taken at a first point in time P1 and is a marked as a transient snapshot denoting a replication related snapshot such as a semi-sync snapshot. The snapshot snap2 802b is taken at a second point in time P2 (subsequent to taking snap1 802a at P1) and is a marked as a transient snapshot denoting a replication related snapshot such as a semi-sync snapshot. The snapshot snap3 802c is taken at a third point in time P3 (subsequent to taking snap2 802b at P2) and is a marked as a transient snapshot denoting a replication related snapshot such as a semi-sync snapshot. The writes W1 and W2 of 804 denote the writes occurring between taking snapshots 802a and 802b. The writes W3 and W4 of 806 denote the writes occurring between taking snapshots 802b and 802c. The writes W5-W8 of 808 denote the writes occurring after taking snapshot 802c. Consistent with discussion above, the writes 804 can denote the replicated writes determined as a result of taking the snap diff with respect to snapshots 802b and 802a; the writes 806 can denote the replicated writes determined as a result of taking the snap diff with respect to the snapshots 802b and 802c; and the writes 808 can be included in the set of replicated writes determined as a result of taking the snap diff with respect to the snapshot 802c and a next consecutive snapshot snap4 that has not yet been taken.

Consistent with other discussion herein, records of the writes 804 and snapshot 802a can remain in the write cache or log until the writes 804 have been replicated from the source system to the target system whereby the replication of such subsequent writes 804 following the transient snap 802a are confirmed. Records of the writes 806 and snapshot 802b can remain in the write cache or log until the writes 806 have been replicated from the source system to the target system whereby the replication of such subsequent writes 806 following the transient snap 802b are confirmed. Records of the writes 808 and snapshot 802c can remain in the write cache or log until the writes 808 have been replicated from the source system to the target system whereby the replication of such subsequent writes 808 following the transient snap 802c are confirmed.

In at least one embodiment, the transient snapshot operation N and all subsequent writes prior to the next successive transient snapshot N+1 taken for replication can be held or retained in the write cache until all such subsequent writes are replicated to the target system. The PDESC recorded in the write cache corresponding to the transient snapshot and the PDESCs corresponding to the subsequent writes can be maintained in the write cache and deleted after the replication to the target system is confirmed or acknowledged.

In at least one embodiment, there can be instances where the transient snapshot PDESCs and subsequent writes cannot be held or retained in the write cache, for example, where the replication of the subsequent writes is extensively delayed such as due to replication link problems, where additional PDESCs are needed on the source system to service a large burst of writes, and the like. In such instances where PDESCs are needed to handle the new incoming writes and there are no free PDESCs or the number of free PDESCs falls below a threshold level, processing can be performed to flush recorded operations (and thus flush their PDESCs) from the log or write cache to obtain free PDESCs. In such instances in at least one embodiment, the flushed operations can even include the transient snapshot and the associated writes not yet replicated as a solution to increase the available or free PDESCs. In at least one embodiment, flushing the transient snapshot and associated writes prior to replication can result in additional processing and unnecessary creation of MD pages for the transient snapshot.

As a result, a larger log or write cache can facilitate handling larger write bursts without triggering flushing the write cache and thus without force flushing the transient snapshot and its corresponding PDESC to obtain free PDESCs for writes of the large write burst. Also, a larger log or write cache allows the system to support more concurrent replication sessions and generally retain in the write cache more transient snapshots and associated subsequent writes such as those due to the increased snapshot frequency of the semi-synch replication feature.

In at least one embodiment, the above-noted capability of purposefully delaying or holding the flushing of some recorded operations in the write cache or log can be advantageously utilized for write hot or write active pages or target locations that are frequently overwritten. In at least one embodiment, a data page that is characterized as write hot can have a write frequency that exceeds a threshold number of writes occurring within a specified time period. Thus, for example, the same logical address or target location can be overwritten frequently (e.g., at a frequency exceeding the threshold number within a specified time period). In at least one embodiment, each write I/O can result in recording a new PDESC and associated PB in the written cache. At a later point in time, the write I/O can be flushed and additional processing performed to create and/or update mapping information and storing the current content written on BE PDs.

In at least one embodiment, the system can identify which target locations are write hot and frequently overwritten. The system can track the metrics used to identify write hot pages or frequently written target locations, or can otherwise be provided with hints of information regarding write hot pages or frequently written target locations. Delaying flushing of a write operation directed to a target location that is frequently overwritten results in the recorded write I/O and its PDESC being retained longer in the write cache. The system can perform optimizations on recorded writes of the write cache or log, such as write folding to recognize subsequent overwrites to the same target location and avoid flushing prior writes to the same target location. For example, at time T1 a first write W1 can write content C1 to target location T1. At a second time T2 after T1, a second write W2 can write content C2 to T1 thereby overwriting C1 with C2. Both W1 and W2 can be recorded in the log or write cache using PDESCs and associated PBs. If both writes W1 and W2 can be retained in the write cache longer such that recorded PDESCs for W1 and W2 are both recorded and stored in the write cache at the same time without being flushed, the system can recognize the foregoing overwrite, can retain the second write W2 in cache, and can remove or free the prior write W1 and its associated PDESC and PB for reuse without having ever flushed W1.

Thus, longer retention in the write cache or log of recorded writes to frequently overwritten target locations affords the system the opportunity to recognize such overwrites with write folding and can avoid or eliminate flushing a prior write such as W1 that is overwritten by a subsequent write such as W2, and can thus avoid or eliminate the overhead incurred in processing the flushed write W1. Such avoided or eliminated processing for W1 can include, for example, eliminating the overhead of creating and/or updating mapping information for the target location T1, and eliminating storing C1 on the BE PDs. Eliminating the flushing of folded writes such as W1 also eliminates unnecessary storing of overwritten content such as C1 on BE PDs which can thus result in SSD endurance improvement where the BE PDs are SSDs.

As noted above, use of the PDESC pool can effectively increase the size of the write cache or log. However, the upper limit of the write cache or log can still be bounded by the size of the PB pool. What will be described in the following paragraphs are techniques of the present disclosure that can be used to further effectively extend the size of the write cache or log. In at least one embodiment, such further effective extension of the write cache can also amplify the benefits obtained in connection with the transient snapshots noted above and in connection with delaying the flushing of write hot pages associated with target locations that are frequently overwritten above a specified frequency within a defined time period. In at least one embodiment, further effective extension of the write cache can also amplify the benefits obtained in connection with the transient snapshots by allowing more subsequent unreplicated writes to remain in the write cache or log of the source system until replicated to the target system. In at least one embodiment, further effective extension of the write cache can also amplify the benefits obtained in connection with delaying the flushing of write hot pages where more such write hot pages can be retained in the write cache or log for longer periods of time to allow for performing write folding of write hot pages that are frequently overwritten In at least one embodiment, the techniques of the present disclosure can be used to leverage BE PDs, such as SSDs providing BE non-volatile storage, to extend the write cache or log. In at least one embodiment, each node can have its own PDESC pool, PB pool and PLB (physical large block) pool. The PDESC pool and PB pool can be located on NVRAM or form of non-volatile persistent storage. The PLB pool can reside on non-volatile BE PDs, such as on an SSD tier of non-volatile BE PDs.

Consistent with discussion herein, ingest write-bandwidth of many storage systems can be limited by the connectivity to its NVRAM devices used for the log or write cache. Increasing this log or write cache write-bandwidth limitation can be accomplished by also writing to other slower non-volatile storage devices for logging or persistently caching content written by large writes. In at least one embodiment as described herein, an active-active storage system can be a log-based or log structured system including two nodes or two storage controllers where each one such node may serve incoming I/Os concurrently. The system can use a log or write cache and can use a log component to record write I/Os. The log component can thus have 2 methods of persisting the write data of the log or write cache depending on the size of the write data. One is with a PB which is located in the PB pool on the NVRAM persistent storage, and the second one is in a PLB of a PLB pool which resides on non-volatile BE PDs, such as on an SSD tier of the BE PDs. A PB in NVRAM persistent storage can be used to record or log content for small write I/Os having an associated write payload less than a maximum size. Alternatively, the PLBs of the PLB pool of the log can be used to directly store content or data written by large write I/O operations such as write I/O operations having an associated write data payload equal to or greater than the specified maximum size. To describe the data and associated write I/O operation, a persistent descriptor or PDESC noted herein can also be maintained in the write cache or log, where each PDESC for a recorded write I/O operation can include metadata information including the target logical address of the write I/O operation. Thus for large writes, the log component can directly log or record the write I/O data of the log on PLBs of the SSD tier (rather than record the write I/O data in a PB of the PB tier).

In connection with storing or logging the write data of such large write I/Os on the SSD tier, the system can allocate buffers for storing the logged write data from the PLBs of the SSD tier. Such allocation can be performed in some minimal stripe size granularity of the PLB, where the stripe size can vary with, and be determined by, the RAID parity configuration (e.g., to avoid RMW (read modify write) operations and write each parity and all data of the same stripe only once). Once the logged write data of a write I/O is stored in a PLB of the log, the address of the PLB can be stored in a corresponding PDESC of the logged write I/O operation. Subsequently, the logged write I/O having the write data stored in the PLB can be flushed from the log. Flushing the logged write I/O where the write data is stored on a PLB can include building the mapping information of MD pages which map the target logical address of the write I/O to a physical location, such as the physical location of the PLB, on the BE PD storing the write data. Building the mapping information of MD pages for the flushed write I/O of the log can include updating various MD pages to map the target logical address to the PLB storing the write data. Thus, flushing a recorded write I/O operation of the log or write cache having its write data stored in a PLB can be similar to flushing when the write data is stored in a PB in that the mapping information or MD pages can be constructed. However in at least one embodiment when flushing the recorded write I/O having its write data stored in a PLB, there is no additional allocation of BE storage since the PLB is already located on BE storage. In this case, the mapping information constructed or updated when flushing a recorded write I/O having its write data stored in a PLB can map the target logical address to the PLB location storing the write data. In contrast, when flushing a recorded write I/O having its write data stored in a PB, the write data is further written out to a new storage location on a BE PD and the mapping information maps the target logical address to the new storage location on the BE PD. The foregoing flushing described above where a recorded write of the write cache has a PDESC and its corresponding write data stored in a PB can also be referred to herein as PB flush processing; and the foregoing flushing described above where a recorded write of the write cache has a PDESC and its corresponding write data stored in a PLB can also be referred to herein as PLB flush processing.

In at least one embodiment in accordance with the techniques of the present disclosure, the log or write cache can be further effectively extended by aggregating multiple smaller portions or PBs of write data from the PB pool and then selectively demoting such PBs of data from the PB pool to the PLB pool of a node. In at least one embodiment, the PBs of the PB pool that can be selected for movement or demotion to the PLB pool can be in accordance with one or more specified selection criteria. For example, in at least one embodiment, the criteria can indicate to select for movement or demotion from the PB pool to the PLB pool PBs of write data characterized as write hot where the associated target storage location is frequently written to or overwritten. For example, a target logical address LA1 that has a write frequency exceeding a specified threshold within a specified period of time can be determined where the target logical address LA1 may have been written to by 3 separate write I/Os recorded in the write cache or log. A write folding optimization can be performed to result in only the latest or most recently recorded write I/O, W3, and its corresponding PB3 and PDESC3 being retained in the log or write cache, whereby LA1 can be classified as a write hot target location that is frequently overwritten and the PB3 storing the most recently written content of W3 can be classified as a write hot page of data or content. Assuming W3 writes content C3 to LA1, C3 can be stored in PB3. The PB3 storing the most recently written content C3 of the latest overwrite W3 to the target logical address LA1 can be selected for movement or demoted to the PLB pool. As another example, the criteria in at least one embodiment can select PBs for demotion or movement to the PLB pool which contain write data waiting to be replicated from a source system such as in connection with the semi-sync replication feature noted above. As noted above for the semi-sync use case, the subsequent pages or PBs of write data of the unconfirmed transient snapshot can be held in the write cache or log until all such PBs of write data have been replicated to the target system. In at least one embodiment, the criteria can indicate that the PBs containing the unreplicated content or write data of the subsequent writes (subsequent to an unconfirmed transient snapshot) can be selected for movement or demoted to the PLB pool. Thus generally the one or more criteria, some examples of which are noted above and elsewhere herein, can be used to specify, at least in part, candidate PBs that can be selected from the PB pool for demotion or movement from a PB pool to a PLB pool. In at least one embodiment, the PLBs of the PLB pool including content or data of such demoted PBs can be viewed as further extending the persistent log or write cache of a system. In at least one embodiment, the PLBs storing content of the demoted PBs can be referred to as an extension of the write cache or log, or the extended write cache or log.

In this manner in at least one embodiment, demoting selected pages of content or write data from PBs of a PB pool or tier to a PLB of a PLB pool or tier can be characterized as yet another way to effectively increase the size of the log or write cache. Multiple selected pages of PBs of a PB pool or tier can be aggregated together and demoted to a PLB of the PLB pool or tier. In at least one embodiment, the selected PBs can store write hot data or content frequently overwritten. In at least one embodiment, the selected PBs can store write data of a volume or LUN (or more generally a storage object) configured for semi-sync replication where the write data of the selected PBs of the source system has not yet been replicated from the source system to the target system. The demoted PBs now stored in a set of PLBs of a PLB pool can thus be retained in the write cache or log for a longer period of time whereby the set of PLBs can be included in the extended write cache or log. In at least one embodiment, demotion or movement of the pages of data from the PBs to the set of PLBs can be performed to increase the number of free PBs available for reuse. Once the PBs selected for movement or demotion have had their content or data stored in the set of PLBs, the selected PBs just demoted are now free and can be reused for storing write data or content of new subsequently received write I/Os. In at least one embodiment, the demotion or movement of content from PBs to PLBs can be performed to increase the number of free PBs and can be performed in at least one embodiment as an alternative to flushing the PDESCs and corresponding demoted PBs from the write cache or log. Put another way in at least one embodiment, rather than flush PBs from the PB pool to increase the number of free PBs, candidates PBs can be selected for movement or demotion to PLBs of the write cache or log extension.

In at least one embodiment, each node of a multi-node system can have its own PB pool, PLB pool and PDESC pool used by the node to persistently record writes in the log or write cache where such writes are received by the node from a storage client, such as an external host. Thus in at least one embodiment of a dual node storage appliance or system, the log or write cache can include the PB pools, PLB pools and PDESC pools collectively of both nodes of the system. In at least one embodiment, the PB pool and PDESC pool can be included in NVRAM storage of the persistent write cache or log, and the PLB pool of the write cache or log extension can be included in BE non-volatile storage such as on SSDs of an SSD tier providing BE storage.

In at least one embodiment, at the I/O ingesting phase, PLB pools of the write cache or log extension (sometimes referred to herein as simply extension) can be used to offload large writes with large write payloads exceeding a specified maximum size, where such writes have their content or write data stored directly in a PLB on BE PDs rather than PBs. In at least one embodiment, at the I/O ingesting phase, PLB pools of the write cache or log extension can also be used to also store multiple coalesced small outstanding writes that independently each have a write payload size not greater than the specified maximum size and that collectively or in the aggregate have a total write payload size exceeding the specified maximum size. In at least one embodiment, the foregoing uses of PLB pools of the write cache or log extension at the I/O ingesting phase can be performed, for example, when the write bandwidth of the NVRAM storage including the PB pool and PDESC pool is saturated such as where the current write bandwidth of the NVRAM exceeds a specified threshold. In this manner in at least one embodiment, the available write bandwidth of the write cache or log can be increased to include the write bandwidth capacity of the NVRAM (storing the PDESC pool and the PB pool) and to also include write bandwidth capacity of SSDs of the SSD tier storing the PLBs. In at least one embodiment, when the current write bandwidth of the NVRAM exceeds a specified threshold, at least some portion of the write I/O data of logged entries of the write cache can be offloaded (from the PBs and NVRAM) to the SSDs by directly storing the write I/O data or content in PLBs. For example, the NVRAM storing the node's PB pool and PDESC pool can have a current write bandwidth (such as a data transfer rate or write throughput rate in an amount of data written within a specified time period such as MBs/second or GBs/second) that exceeds a specified threshold. As another example, a percentage or ratio of the current write bandwidth with respect to a specified maximum bandwidth can be determined where the NVRAM can be determined as saturated when the percentage or ratio exceeds a specified maximum percentage or ratio. In at least one embodiment, the I/O ingesting phase refers to the processing of a received write I/O that includes persistently recording the write I/O in the write cache or log, and once the write I/O is recorded in the write cache or log, returning an acknowledgement regarding write I/O completion to the storage client, such as a host that sent the write I/O. An example illustrating use of the PLB pool of a node to offload large writes and a set of aggregated coalesced multiple smaller writes when the NVRAM, or more generally, the PB pool or PB tier, is saturated is described in more detail below in connection with FIG. 8.

Figure 8:
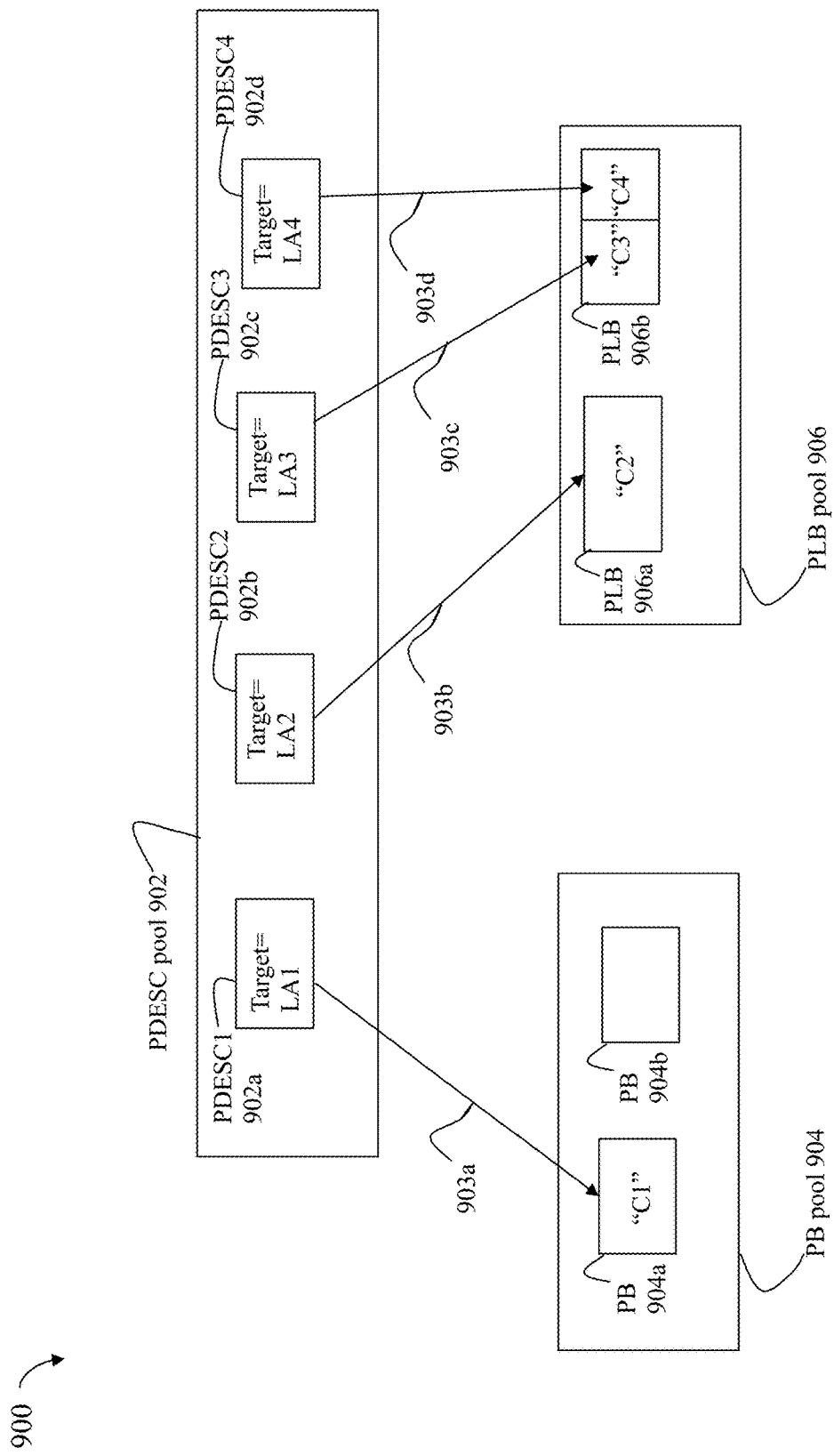
FIGS. 8, 9, and 10 are examples illustrating various structures and components in at least one embodiment in accordance with the techniques of the present disclosure.

Referring to FIG. 8, shown is an example 900 illustrating a log or write cache using a PDESC pool, a PB pool and a PLB pool in at least one embodiment in accordance with the techniques of the present disclosure.

The example 900 generally illustrates use of a PDESC to describe a logged or recorded write operation of the log or write cache where the corresponding write data or content can be stored in either a PB or a PLB. The example 900 includes only the PDESCs 902a-d, the PBs 904a-b and PLBs 906a-b for simplicity of illustration. The example 900 includes the PDESC pool 902 of PDESCs, the PB pool 904 of PBs, and the PLB pool 906 of PLBs. In at least one embodiment, the PDESC pool 902 and the PB pool 904 can be included in NVRAM storage. In at least one embodiment, the PLB pool can be included in an SSD tier of BE PDs. In at least one embodiment, the NVRAM storage used for 902 and 904 can be relatively faster in terms of performance than the SSD tier of BE PDs used for 906. Put another way, in at least one embodiment, the write latency of NVRAM storage used for 902 and 904 can generally be relatively lower than the write latency of the SSD tier of BE PDs used for 906. In at least one embodiment, the elements 902 and 904 of the NVRAM can be included in the regular write cache or log, and the element 906 of the SSD tier of BE PDs can be considered the extended write cache or log (e.g., the write cache or log extension), where the speed or write latency of the regular write cache or log (e.g., NVRAM) is relatively quicker or faster than the speed or write latency of the extended write cache or log (e.g., SSD tier of BE PDs).

In the example 900, the PDESC 902a can be used to record or log a first write I/O W1 that writes content C1, where W1 is described by the PDESC 902a. In this example, the PDESC 902a indicates that W1 writes content C1 to the target logical address LA1, and where the PDESC 902a is associated with or points to (903a) PB 904a, and PB 904a stores C1.

In the example 900, the PDESC 902b can be used to record or log a second write I/O W2 that writes content C2, where W2 is described by the PDESC 902b. In this example, the PDESC 902b indicates that W2 writes content C2 to the target logical address LA2, and where the PDESC 902b is associated with or points to (903b) PLB 906a, and PLB 906a stores C2.

In the example 900, the PDESC 902c can be used to record or log a third write I/O W3 that writes content C3, where W3 is described by the PDESC 902c. In this example, the PDESC 902c indicates that W3 writes content C3 to the target logical address LA3, and where the PDESC 902c is associated with or points to (903c) a first location in PLB 906b, and C3 is stored at the first location of PLB 906b.

In the example 900, the PDESC 902d can be used to record or log a fourth write I/O W4 that writes content C4, where W4 is described by the PDESC 902d. In this example, the PDESC 902d indicates that W4 writes content C4 to the target logical address LA4, and where the PDESC 902d is associated with or points to (903d) a second location in PLB 906b, and C4 is stored at the second location of PLB 906b.

It should be noted that although a single PLB 906a is illustrated for simplicity as storing content C2 of a single write W2, and that a single PLB 906b is illustrated for simplicity as storing content C3 and C4 of two corresponding writes W3 and W4 each writing a page of data or content of a specified size such as 4K bytes, more generally, a single PLB 906a-b can have a size that is much larger and capable of storing more than 1 or 2 4 Kbyte pages of write data. For example in at least one embodiment, a single PLB can be 2 MBs in size and each recorded write, such as W2, W3 and W4, can write a single 4K byte page of write data or content.

Although not explicitly illustrated in the PDESCs 902a-d, each PDESC can also include a sequence number or ID, sometimes also referred to as a global sequence ID or number, denoting the time order in which recorded operations of the write cache or log are applied relative to one another. In at least one embodiment, sequence IDs can be assigned to I/Os and other operations at ingest time when received by the storage system. Although an embodiment can perform optimizations such as, for example, write folding, flushing optimizations and the like, such optimizations can still result in maintaining resulting stored content in accordance with the write consistency ordering as denoted by monotonically increasing sequence IDs of the PDESCs.

Consistent with discussion above as a result of saturation of the PB pool, PB tier and/or NVRAM storage storing the PB pool or tier, the PLB pool can be used to offload storing write data or content of large writes or sets of aggregated coalesced multiple smaller writes at the I/O ingesting phase. Thus, the example 900 illustrates the result of ingesting write W1 that includes storing content C1 of the write W1 in the PB 904a, where C1 does not exceed a specified threshold size and can thus denote a small write I/O payload. The example 900 also illustrates the result of ingesting write W2 that includes storing content C2 of the write W2 directly in the PLB 906a, where C2 can exceeds the specified threshold size and can thus denote a single large write I/O payload. The example 900 also illustrates the result of ingesting writes W3 and W4 where payloads C3 and C4 of such writes W3, W4 can be coalesced and stored directly in the single PLB 906b.

The example 900 illustrates use of the PLB pool as an extension of the write cache or log in connection with the write or I/O ingesting phase. Consistent with discussion herein in at least one embodiment, pages of content or data stored in the PB pools can be flushed by performing PB flush processing described herein in more detail; and pages or content of data stored in the PLB pools can be flushed by performing PLB flush processing described elsewhere herein in more detail.

Thus, in at least one embodiment discussed above, the size of the regular write cache or log, denoted by the NVRAM including the PB pools and PDESC pools, can be expanded or extended by using the PLB pools stored on one or more SSDs of the SSD tier providing BE non-volatile storage.

In at least one embodiment in accordance with the techniques of the present disclosure, the write cache or log can be further extended by additionally demoting or moving content from the PB pool to the PLB pool subsequent to the I/O ingesting phase of such recorded write I/Os. Thus in at least one embodiment, the techniques of the present disclosure can perform additional processing to demote or move content from PBs (of the regular write cache or log) to PLBs (of the write cache or log extension) to further increase the overall size of the write cache or log after write I/Os have been persistently recorded in the write cache or log, where such write I/Os have their content stored in PBs of the PB pools.

In at least one embodiment, the techniques of the present disclosure provide for selectively, in accordance with one or more criteria, determining candidate PBs of content for demotion or movement to PLBs of the PLB pools. In at least one embodiment, techniques of the present disclosure can further include determining when to demote at least some of the selected candidate PBs. In at least one embodiment, techniques of the present disclosure can further include processing describing steps that can be performed to demote pages of content or data from the PB pool to the PLB pool with transactional protection.

Figure 9:
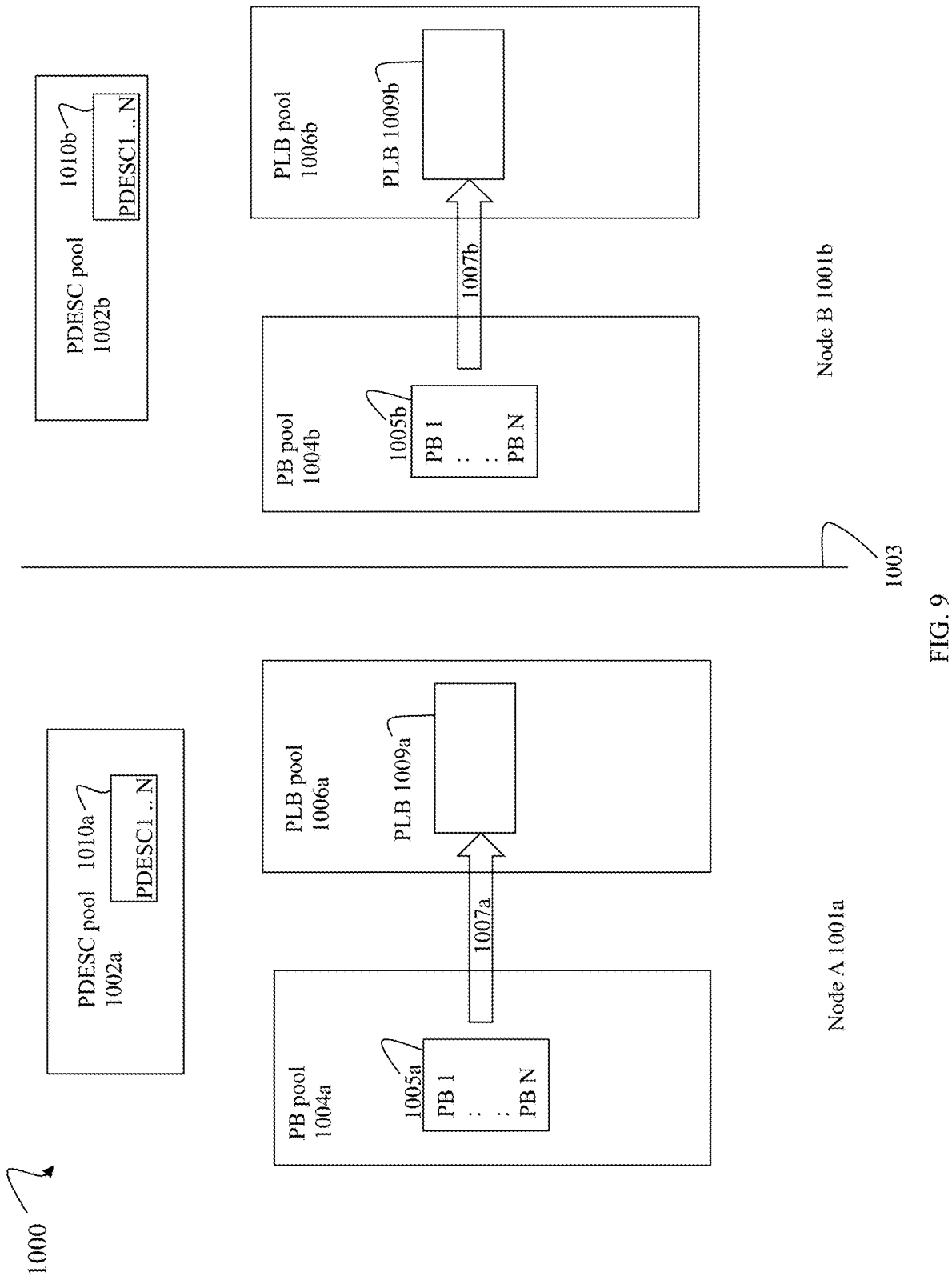

Referring to FIG. 9, shown is an example 1000 illustrating components and use of the techniques of the present disclosure in at least one embodiment.

The example 1000 illustrates components that can be included in a dual node system including a first node, node A 1001a, and a second node, node B 1001b. Components to the left of line 1003 are those included in the node A 1001a, and components to the right of the line 1003 are those included in the node 1001b.

Each node in the example 900 can include its own PDESC pool, PB pool and PLB pol which the node can use to persistently record operations, such as write operations, received by the node in the write cache or log. The node A 1001a includes PDESC pool 1002a, PB pool 1004a, and PLB pool 1006a. The node B 1001b includes PDESC pool 1002b, PB pool 1004b and PLB pool 1006b. Each node 1001a-b can also include other components not illustrated in 900 for simplicity. In at least one embodiment as in the example 900, the regular write cache or log (e.g. non-extended portion of the write cache or log) can include PDESC pools 1002a, 1002b, and PB pools 1004a, 1004b, where 1002a-b and 1004a-b can be stored on NVRAM storage. The write cache or log extension (e.g., extended portion of the write cache or log) can include PLB pools 1006a and 1006b located on BE non-volatile storage such as SSDs of an SSD tier of the BE PDs.

There can be N PDESCs 1010a in the PDESC pool 1002a each referencing or pointing to a corresponding one of the N PBs 1005a. Each of the N PDESCs 1010a and a corresponding one of the N PBs 1005a can represent a recorded write of the write cache or log such as stored as a result of ingesting a write I/O received at node A 1001a. At a later point in time, processing can be performed to evaluate one or more trigger conditions discussed elsewhere herein. Responsive to an occurrence of one of the trigger conditions such as where one of the trigger conditions evaluates to true, processing can be performed demote content or data from source PBs of the PB pool 1004a to one or more PLBs of the PLB pool 1006a to thereby free or make available the source PBs. Consistent with other discussion herein, the one or more trigger conditions can trigger demotion of content of PBs of the PB pool 1004a to PLBs of the PLB pool 1006a based, at least in part, on the amount of free PBs of the PB pool 1004a falling below a desired level and/or the amount of used or consumed PBs of the PB pool 1004a exceeding a desired level.

Responsive to an occurrence of a trigger condition on node A 1001a, processing can be performed to demote content of PB pool 1004a to the PLB pool 1006a. With reference to the example 1000, demotion processing on the node A 1001a performed as a result of the trigger condition occurrence can include selecting N PBs 1005a as candidates for demotion to the PLB pool 1006a. In at least one embodiment, the N candidate PBs 1005a can be selected in accordance with one or more criteria discussed elsewhere herein. Content or data of the selected N candidate PBs 1005a can be demoted 1007a to the PLB pool 1006a, where the content of the N PBs 1005a can be moved or copied to PLB 1009a. Generally in at least one embodiment, N can denote a number of PBs selected having an aggregated size so that content of such N PBs can be stored in a single PLB 1009a. Subsequent to demoting the N PBs 1005a, the N PBs 1005a can be reclaimed and added to the list of free PBs available for reuse. The foregoing demotion processing can be repeated generally one or more times as needed to increase the number of free PBs of the PB pool 1004a to a desired level. Put another way, the foregoing demotion processing can be repeated generally one or more times as needed to decrease the number of used PBs of the PB pool 1004a to a desired level. In at least one embodiment, the demotion processing of selecting N PBs for demotion to the PLB pool 1006a can be performed until one or more stop conditions are met where, for example, one of the specified stop conditions evaluates to true. The foregoing cycle of a trigger condition occurring and triggering demotion processing to demote one or more sets of N PBs to one or more corresponding PLBs can be repeated in an ongoing manner as one or more trigger conditions occur and evaluate to true at various points in time. In at least one embodiment, detection and monitoring of conditions on the node A 1001a to determine whether a defined trigger condition with respect to node A 1001a is met or true can be performed in an ongoing manner and, responsive to the defined trigger condition being true or met, can trigger demotion processing to demote one or more sets of N PBs to the PLB pool 1006a.

Node B 1001b can perform processing in a manner similar to that as described for node A 1001a. There can be N PDESCs 1010b in the PDESC pool 1002b each referencing or pointing to a corresponding one of the N PBs 1005b. Each of the N PDESCs 1010b and a corresponding one of the N PBs 1005b can represent a recorded write of the write cache or log such as stored as a result of ingesting a write I/O received at node B 1001b. At a later point in time, processing can be performed to evaluate one or more trigger conditions discussed elsewhere herein. Responsive to an occurrence of one of the trigger conditions such as where one of the trigger conditions evaluates to true, processing can be performed demote content or data from source PBs of the PB pool 1004b to one or more PLBs of the PLB pool 1006b to thereby free or make available the source PBs. Consistent with other discussion herein, the one or more trigger conditions can trigger demotion of content of PBs of the PB pool 1004b to PLBs of the PLB pool 1006b based, at least in part, on the amount of free PBs of the PB pool 1004b falling below a desired level and/or the amount of used or consumed PBs of the PB pool 1004b exceeding a desired level.

Responsive to an occurrence of a trigger condition on node B 1001b, processing can be performed to demote content of PB pool 1004b to the PLB pool 1006b. With reference to the example 1000, demotion processing on node B 1001b performed as a result of the trigger condition occurrence can include selecting N PBs 1005b as candidates for demotion to the PLB pool 1006b. In at least one embodiment, the N candidate PBs 1005b can be selected in accordance with one or more criteria discussed elsewhere herein. Content or data of the selected N candidate PBs 1005b can be demoted 1007b to the PLB pool 1006b, where the content of the N PBs 1005b can be moved or copied to PLB 1009b. Generally in at least one embodiment, N can denote a number of PBs selected having an aggregated size so that content of such N PBs can be stored in a single PLB 1009b. Subsequent to demoting the N PBs 1005b, the N PBs 1005b can be reclaimed and added to the list of free PBs available for reuse. The foregoing demotion processing can be repeated generally one or more times as needed to increase the number of free PBs of the PB pool 1004b to a desired level. Put another way, the foregoing demotion processing can be repeated generally one or more times as needed to decrease the number of used PBs of the PB pool 1004b to a desired level. In at least one embodiment, the demotion processing of selecting N PBs for demotion to the PLB pool 1006b can be performed until one or more stop conditions are met where, for example, one of the specified stop conditions evaluates to true. The foregoing cycle of a trigger condition occurring and triggering demotion processing to demote one or more sets of N PBs to one or more corresponding PLBs can be repeated in an ongoing manner as one or more trigger conditions occur and evaluate to true at various points in time. In at least one embodiment, detection and monitoring of conditions on node B 1001b to determine whether a defined trigger condition on node B 1001b is met or true can be performed in an ongoing manner and, responsive to the defined trigger condition being true or met, can trigger demotion processing to demote one or more sets of N PBs to the PLB pool 1006b.

Thus, the example 1000 generally illustrates at a high level the demotion or movement of PBs from PB pools 1004a-b to corresponding PLB pools 1006a-b on the nodes 1001a-b. In at least one embodiment, each node 1001a-b can independently perform evaluation and processing in accordance with the techniques of the present disclosure to demote content from the node's PLB pool to the node's corresponding PLB pool. The elements 1007a-b each denote demotion of a single set of content of N PBs to a single PLB where such demotion can be generally performed one or more times by each node.

Figure 10:
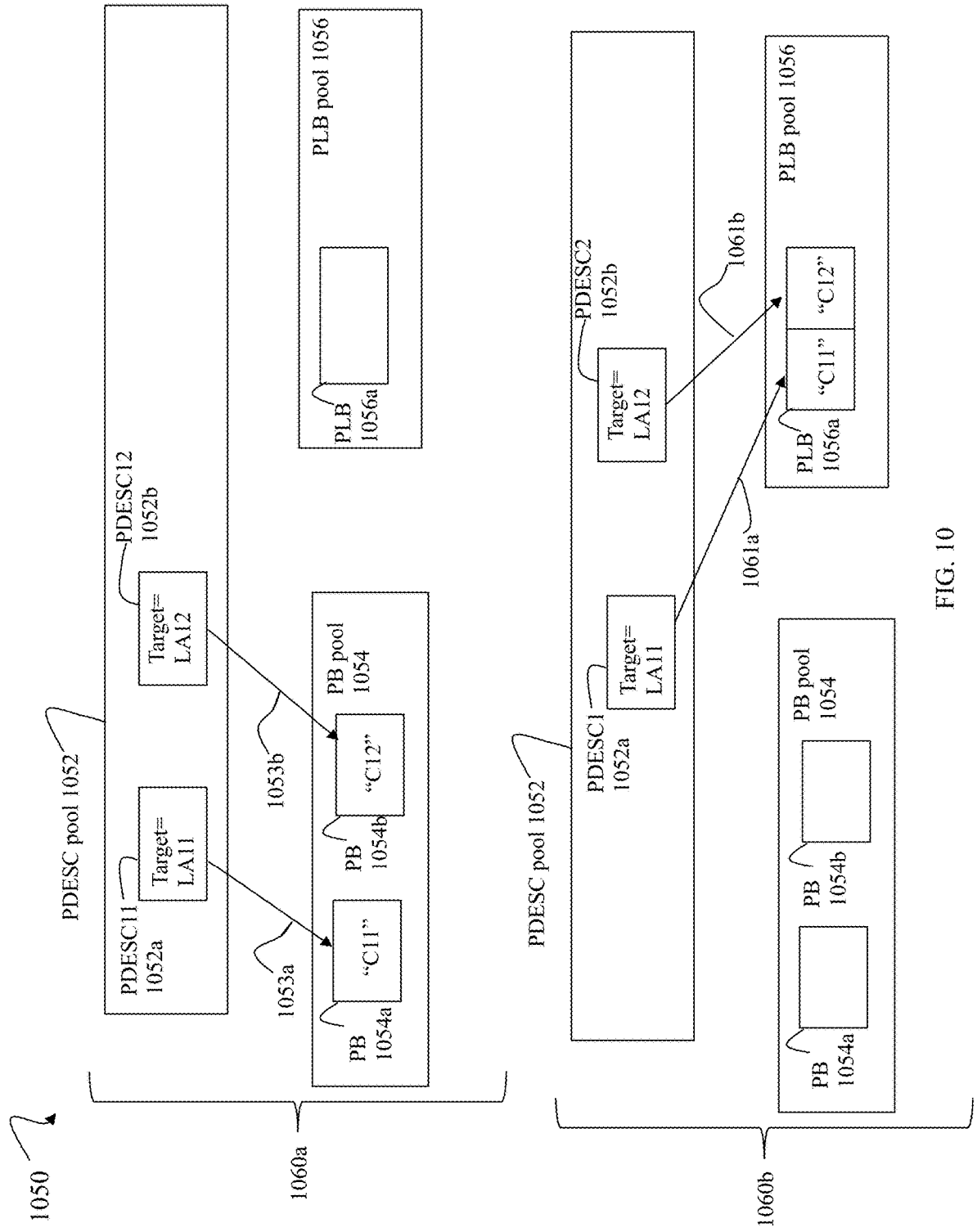

Referring to FIG. 10, shown is an example 1050 illustrating updating or modification of PDESCs of recorded write I/Os having corresponding write content or data demoted from PBs of a PB pool to a PLB of a PLB pool in at least one embodiment.

The example 1050 includes element 1060a denoting the PDESC pool 1052, PB pool 1054 and PLB pool 1056 of a node at a first point in time T1 after recording two write I/Os W11 and W12 in the write cache or log. In particular, W11 can write content C11 to the target logical address LA11, and can be recorded in the write cache or log using PDESC 1052a and PB 1054a. PDESC 1052a describes W11 and references or points (1053a) to PB 1054a storing C11. W12 can write content C12 to the target logical address LA12, and can be recorded in the write cache or log using PDESC 1052b and PB 1054b. PDESC 1052b describes W12 and references or points (1053b) to PB 1054b storing C12. At time T1, the PLB 1056a can be free.

At a second point in time T2 subsequent to T1, demotion processing can be triggered and performed. Demotion processing in the example 1050 can select content of PBs 1054a-b for demotion or movement from PB pool 1054 to PLN 1056a of the PLB pool 1056. Element 1060b illustrates the state of the PDESC pool 1052, PB pool 1054 and PLB pool 1056 after demotion of the content of PBs 1054a-b to PLB 1056a. In particular, the content or data C11 and C12 is demoted or moved from PBs 1054a-b to PLB 1056a. Additionally, PDESC 1052a is updated to now reference or point to a location in PLB 1056a of the corresponding content C11 of W11 described by PDESC 1052a; and PDESC 1052b is updated to now reference or point to a location in PLB 1056a of the corresponding content C12 of W12 described by PDESC 1052b. Also, the PBs 1054a-b in the illustration 1060b can now be marked as free or available for reuse.

Thus, the example 1050 illustrates the state of structures and pools 1052, 1054 and 1056 before demotion processing in 1060a and after demotion processing in 1060b in at least one embodiment in accordance with the techniques of the present disclosure.

In at least one embodiment, storage for a PLB can be allocated from non-volatile storage otherwise used to provide BE non-volatile storage. In this manner, the PLB pool of the write cache or log extension can be characterized in at least one embodiment as converting a portion of the BE non-volatile storage to the write cache or log extension for use storing the content of the demoted PBs. In at least one embodiment, the amount of BE non-volatile storage converted and used as the write cache or log extension can change and vary over time as the PLBs of the extension are allocated in connection with demotion processing described herein and then subsequently freed, for example, as a result of PLB flushing. In at least one embodiment, the amount of BE non-volatile storage, such as of an SSD tier, converted and used as the write cache or log extension can be based, at least in part, on the number of PLBs allocated for use in connection with demotion processing described herein to store content of demoted PBs. In at least one embodiment, storage of PLBs of the write cache or log extension storing write hot pages of data of frequently overwritten logical addresses can be reclaimed and made available for reuse, for example, as a result of write folding discussed elsewhere herein.

In at least one embodiment, storage of PLBs of the write cache or log extension storing unreplicated write data such as of a volume or other storage object configured for semi-sync replication can be reclaimed and made available for reuse, for example, subsequent to replicating such write data as discussed elsewhere herein. In at least one embodiment, storage of such reclaimed free PLBs can be generally reused for any suitable purposes such as, for example, as BE non-volatile storage storing content of a PB as a result of subsequent PB flushing, and/or for directly storing write data of subsequent large writes during the I/O ingestion phase as discussed elsewhere herein.

The techniques of the present disclosure can define one or more criteria used to select pages of content or data stored in PBs of the PB pool to demote to PLBs of the PLB pool. In at least one embodiment, a page selector component of a node can perform processing to determine and select, in accordance with the one or more criteria, candidate pages of content of PBs for demotion or movement to PLBs. In at least one embodiment, the PBs selected can include data or content that is likely or expected to be removed from the write cache or log prior to being flushed from the write cache or log through the PB or PLB flush processing (e.g., prior to committing the recorded write). Thus generally in at least one embodiment, at least one of the criteria can specify one or more conditions used to identify PBs of data or content that is likely or expected to be removed from the write cache or log prior to being flushed from the write cache or log through the PB or PLB flush processing (e.g., prior to committing the recorded write).

In at least one embodiment, it does not make sense to demote pages of PBs from the PB pool to the PLB pool without considering characteristics about such pages of content or data such as can be specified in the one or more criteria. If pages of PBs demoted to PLB pools eventually have to go through the process of late compression and/or late deduplication as part of committing the flushed write operation, the demoting can introduce additional overhead to the system in terms of both computation and backend write amplification. Thus as part of the solution in at least one embodiment, the page selector can select, at least in part based on the criteria, PBs that include data or content that is likely or expected to be removed from the write cache or log prior to being flushed from the write cache or log through the PB or PLB flush processing (e.g., prior to committing the recorded write).

For the semi-sync use case consistent with other discussion herein, the subsequent write data of the unconfirmed transient snap such as described elsewhere herein (e.g., FIG. 7) can be retained in the write cache of the source system until such write data has been replicated from the source system to the target system. In at least one embodiment, the foregoing retention of the subsequent write data in the write cache or log can be due to the restriction of flushing order between snapshot and writes. If one or more of the trigger conditions discussed elsewhere evaluate to true, thereby indicating a low amount of free or available PBs of the PB pool and triggering demotion or movement of write data from PBs to PLBs, the page selector can select for demotion PBs that store write data or content of such subsequent writes of a volume, LUN or storage object configured for semi-sync replication, or more generally, configured for asynchronous replication with an RPO below a specified threshold, such as a number of seconds less than 10 seconds. In at least one embodiment, the page selector component can select PBs for demotion that contain write data or content awaiting replication, where such write content or data are subsequent writes of a transient snapshot of a storage object configured for semi-sync replication. In at least one embodiment, one or more criteria can be defined that specify to select PBs based, at least in part, on whether the PBs contain write data or content awaiting replication, where such write content or data are subsequent writes of a transient snapshot of a storage object configured for semi-sync replication. More generally, the one or more criteria can specify conditions in accordance with the foregoing characteristics of such PBs storing unreplicated write data subsequent to a transient snapshot.

For the write-hot pages consistent with other discussion herein, it can be beneficial to retain in the write cache or log such write hot pages of content associated with target logical addresses that are frequently overwritten. In at least one embodiment, the page selector can select PBs containing such write hot data or content of frequently written/overwritten logical addresses for demotion from PBs to PLBs since it can be unlikely or expected that such PBs will not be flushed by regular flushing (PB flush processing or PLB flush processing) and committed. In at least one embodiment, such write hot pages of content can be expected to be removed from the write cache or log as a result of write folding optimization processing as discussed elsewhere herein. By demoting such PBs of write hot content or data to PLBs, write folding optimization potential increases since such write hot pages of content of frequently written target logical addresses can remain in the write cache or log longer and/or since the number of write hot pages of content that can be stored in the write cache or log increases. In at least one embodiment, one or more criteria can be defined that specifies to select PBs based, at least in part, on whether the PBs contain write hot pages of write data or content of target logical addresses that are frequently overwritten. More generally, the one or more criteria can specify conditions in accordance with the foregoing characteristics of such PBs storing write hot content of frequently overwritten logical addresses.

In at least one embodiment, the techniques of the present disclosure can define one or more trigger conditions that, when evaluated to true, can trigger demoting pages of content from the PB pool or tier to the PLB pool or tier. In at least one embodiment, one trigger condition can be based, at least in part, on current PB pool utilization exceeding a specified threshold. In at least one embodiment, PB pool utilization can be a metric expressed as a percentage denoting a percentage of the PBs of the PB pool that are used or consumed for storing content or data of the write cache or log. In at least one embodiment, a PB pool utilization of 100% can denote use or consumption of all PBs of the PB pool where there are no free or available PBs. At the other extreme, a PB pool utilization of 0% can denote a condition when all PBs of the PB pool are free or available for use, where no PBs of the PB pool are currently used or consumed. A trigger condition can be defined that specifies when the PB pool utilization exceeds the specified threshold, processing for demotion or movement of data from PBs to PLBs can be performed.

It should be noted that the PB pool utilization can be high and exceed a specified maximum threshold while the current write bandwidth of the PB pool and/or NVRAM is low, such as below the specified saturation level. As noted above in at least one embodiment, the current write bandwidth of the PB pool and/or NVRAM exceeding the specified saturation level can trigger directly storing large writes and/or multiple small coalesced writes directly to PLBs during I/O ingesting as noted above. Thus, PB pool utilization can be high independent of whether the current write bandwidth of the PB pool and/or NVRAM is high and exceeds the specified saturation level. In at least one embodiment, PB pool utilization exceeding the maximum threshold can denote a condition of running out of free PB capacity for recording subsequent write I/O content. Thus, to avoid running out of free PBs for recording subsequent write I/Os in the write cache or log, the trigger condition can trigger processing to demote or move data from PBs to the PLBs thereby freeing such PBs for reuse with storing content of subsequent write I/Os.

As a variation, rather than use a percentage such as PB pool utilization between 0% and 100%, an embodiment can specify integer values or counts for the number of PBs utilized and the specified threshold. In this case, a trigger condition can be defined that specifies when the current number of PBs utilized exceeds the specified threshold, processing for demotion or movement of data from PBs to PLBs can be performed. An embodiment can define a trigger condition that specifies when the current number of free or available PBs falls below a minimum threshold, processing for demotion or movement of data from PBs to PLBs can be performed.

An embodiment can define a PB-related metric denoting a percentage of free or available PBs in the PB pool. The percentage of free PBs in the PB pool can denote a percentage of all PBs of the PB pool that are free or available for use. In at least one embodiment, a percentage of free PBs=100% can denote a condition where there are no used or consumed PBs of the PB pool and where all PBs of the PB pool are free or available. At the other extreme, the percentage of free PBs of the PB pool of 0% can denote a condition when all PBs of the PB pool are consumed and no PBs of the PB pool are free or available for use. A trigger condition can be defined that specifies when the percentage of free PBs of the PB pool falls below a minimum threshold, processing for demotion or movement of data from PBs to PLBs can be performed.

As a variation, rather than use a percentage such as a percentage of free PBs of the PB pool between 0% and 100%, an embodiment can specify integer values or counts for the number of free or available PBs of the PB pool and the specified threshold. In this case, a trigger condition can be defined that specifies when the current number of PBs free or available falls below the specified minimum threshold, processing for demotion or movement of data from PBs to PLBs can be performed.

In at least one embodiment, the demotion or movement of data from PBs to PLBs can be performed by a node until one of one or more specified stop conditions is met. In at least one embodiment, a stop condition can specify to stop demoting or moving data from PBs to PLBs when the size or number of free PLBs reaches a specified target level. In at least one embodiment, a stop condition can specify to stop demoting or moving data from PBs to PLBs when the PB pool utilization drops below a target level or threshold.

In at least one embodiment, the regulation target of a flush regulator component can be to maintain the fullness of the PB pool of a node at a reasonable level, which is a tradeoff between write amortization and the ability to withstand bursts of write I/Os. When the PB pool utilization surpasses a predetermined watermark level, which is above a regulation target, demotion or movement of PBs to PLBs can be initiated. In at least one embodiment, the demotion or movement process of PBs to PLBs can stop, for example, when the PLB pool size reaches an upper limitation or the PB pool utilization drops below a predefined watermark. In at least one embodiment, demoting or movement of PBs to PLBs and other flush processing, such as flushing recorded writes from the write cache or log, can be performed in parallel. In at least one embodiment, such demoting or movement of content from PBs to PLBs can be considered an additional type of flushing performed by the flush regulator component in addition to regular flushing, such as PB flush processing and PLB flush processing that flush recorded writes of the write cache or log.

In at least one embodiment, a page demoter component of a node can perform processing to demote pages of PBs from a PB pool to a PLB pool with transactional protection. In at least one embodiment, such transactional protection can mean that the demotion is performed atomically as a single discreet operation in that all selected pages of PBs included in a single PLB are demoted to the PLB pool, or none of the selected pages of PBs are demoted.

Figure 11:
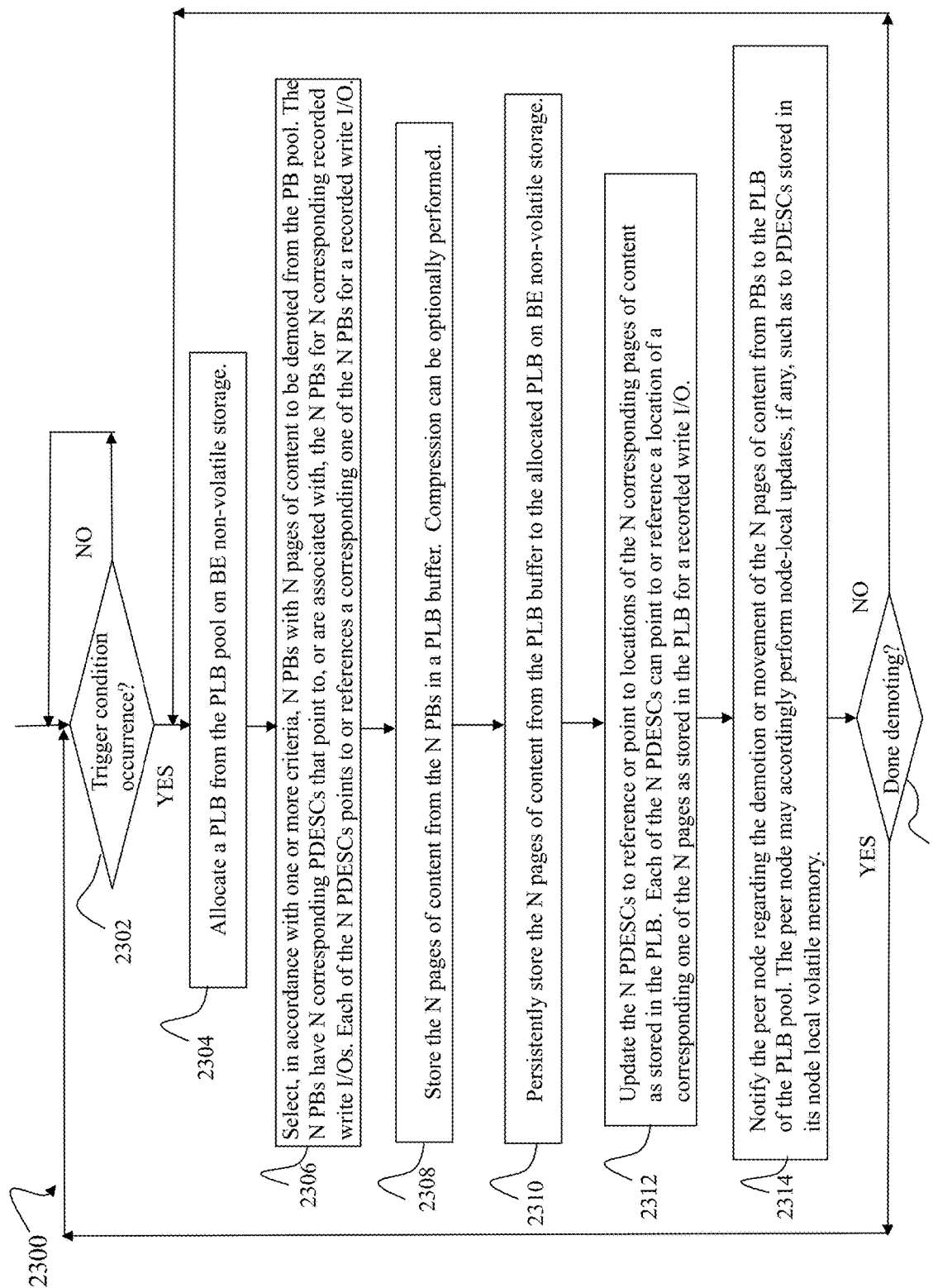
FIGS. 11, 12 and 13 are flowcharts of processing steps that can be performed in at least one embodiment in accordance with the techniques of the present disclosure.

In at least one embodiment, the demotion processing can include performing processing as described below in the flowchart 2300 of FIG. 11. In at least one embodiment, the processing of flowchart 2300 can be performed independently by each node using resources of the PDESC pool, PB pool and PLB pool of the node.

At the step 2302, a determination is made as to whether there has been a trigger condition occurrence where one of a defined set of trigger condition(s) can evaluate to true. Such one or more trigger conditions are discussed in more detail elsewhere herein, where if a trigger condition occurs or evaluates to true, subsequent steps of 2300 can be performed to demote PBs from the PB pool to the PLB pool. If the step 2302 evaluates to no, processing remains at the step 2302. If the step 2302 evaluates to yes, processing proceeds to the step 2304.

At the step 2304, a PLB can be allocated from the PLB pool on BE non-volatile storage. From the step 2304, control proceeds to the step 2306.

At the step 2306, processing can be performed to select, in accordance with one or more criteria, N PBs with N pages of content to be demoted from the PB pool. The N PBs have N corresponding PDESCs that point to, or are associated with, the N PBs for N corresponding recorded write I/Os. Each of the N PDESCs points to or references a corresponding one of the N PBs for a recorded write I/O. In at least one embodiment, "N" can generally be any suitable integer value greater than zero and can vary with the sizes of each PB and each PLB. In at least one embodiment, each PB can be 4K bytes in size and each PLB can be 2 MB (megabytes) in size. In at least one embodiment, N can be selected such that data or content of N PBs can be stored in a single PLB of the PLB pool. From the step 2306, control proceeds to the step 2308.

At the step 2308, processing can be performed to store the N pages of content from the N selected PBs (selected in the step 2306) in a PLB buffer. In at least one embodiment, compression can optionally be performed on the N pages of content in the PLB buffer to produce a compressed form of the content stored in the PLB buffer. In at least one embodiment, the PLB buffer can be a volatile memory buffer used as a temporary buffer to hold content that will be subsequently stored in the PLB. From the step 2308, control proceeds to the step 2310.

At the step 2310, processing can be performed to persistently store the N pages of content from the PLB buffer to the allocated PLB on BE non-volatile storage. The PLB used as the target or destination storage location in the step 2310 can be the PLB previously allocated in the step 2304 from the PLB pool included in BE non-volatile storage. From the step 2310, control proceeds to the step 2312.

At the step 2312, processing can be performed to update the N PDESCs to reference or point to locations of the N corresponding pages of content as now stored in the PLB of the PLB pool on BE non-volatile storage. Each of the N PDESCs can point to or reference a location of a corresponding one of the N pages as stored in the PLB for a recorded write I/O. Put another way, the N PDESCs can be updated in the step 2312 to now reference content as stored in the new persistent non-volatile storage locations of the PLB on BE non-volatile storage. Rather than reference a PB, each of the N PDESCs can now reference a storage location within the PLB where the PDESC's corresponding content or data is stored. From the step 2312, control proceeds to the step 2314.

At the step 2314, processing can be performed to notify the peer node regarding the demotion or movement of the N pages of content from the N PBs to the single PLB of the PLB pool on BE non-volatile storage. The peer node may, for example, accordingly perform node-local updates, if any, such as to PDESCs stored in its node local volatile memory. From the step 2314, control proceeds to the step 2316.

At the step 2316, a determination can be made as to whether demotion processing should stop. In at least one embodiment, one or more stop conditions can be defined identifying when demotion processing should stop or halt. In at least one embodiment, each stop condition can specify a condition that, if true, indicates the current cycle of demotion processing performed by the flowchart 2300 should stop or halt. Examples of stop conditions that can be used in at least one embodiment are discussed in more detail elsewhere herein. In at least one embodiment, if one of the defined stop conditions evaluates to true, the step 2316 can evaluate to yes, and otherwise, the step 2316 can evaluate to no. If the step 2316 evaluates to no, whereby demotion processing of the current cycle is not yet done, control can proceed to the step 1304 to demote the next set of pages of content from N PBs to the PLB pool. If the step 2316 evaluates to yes, whereby demotion processing of the current cycle is done, control proceeds to the step 2302 to wait for the next occurrence of a trigger condition where the step 2302 evaluates to yes.

It should be noted that in the flowchart 2300 in at least one embodiment, the existing PDESCs can be reused and updated to reference the new storage locations of the content within the single PLB. Alternatively, rather than reuse and update the existing PDESCs, an embodiment can 1) allocate new PDESCs from the PDESC pool and update the newly allocated PDESCs to reference or point to the storage locations of the corresponding content within the single PLB; and 2) reclaim and free the existing PDESC As can be observed from the flowchart 2300 and related discussion, the demotion transaction to demote content of N PBs to a single PLB does not consume additional PDESCs. As discussed above, in at least one embodiment, the original N PDESCs can be updated to reference the new storage locations of content in the PLB rather than PBs. Alternatively in at least one embodiment, N new PDESCs can be allocated from the PDESC pool and used, and then the original N PDESCs can be reclaimed and returned to the free list of the PDESC pool. In at least one implementation of the latter alternative embodiment, to avoid a potential deadlock scenario when the PDESC pool is running out of free PDESCs, N or more PDESCs of the PDESC pool can be reserved and dedicated for use with demotion processing.

In at least one embodiment consistent with discussion herein, sequence IDs or numbers can be generated at I/O ingest time as I/Os are received and as write I/Os are recorded in the write cache or log. Each recorded operation of the write cache or log can be assigned a unique sequence ID of a monotonically increasing sequences of integers denoting the time order of the recorded operations. The time order of such recorded operations of the write cache or log can be maintained by the page demoter component. In at least one embodiment, the sequence ID of each recorded operation of the write cache or log can be persisted as a field in the corresponding PDESC of the recorded operation.

What will now be described are flowcharts of processing steps summarizing regular flush processing in at least one embodiment in accordance with the techniques of the present disclosure. Such regular flush processing is discussed elsewhere herein and summarized in FIGS. 12 and 13. In at least one embodiment, regular flush processing can include flushing recorded operations of the log or write cache and can include flushing recorded write operations having their write data or content stored in the PB pool (e.g., PB flush processing) and, can include flushing recorded write operations having their write data or content store din the PLB pool (e.g., PLB flush processing).

Figure 12:
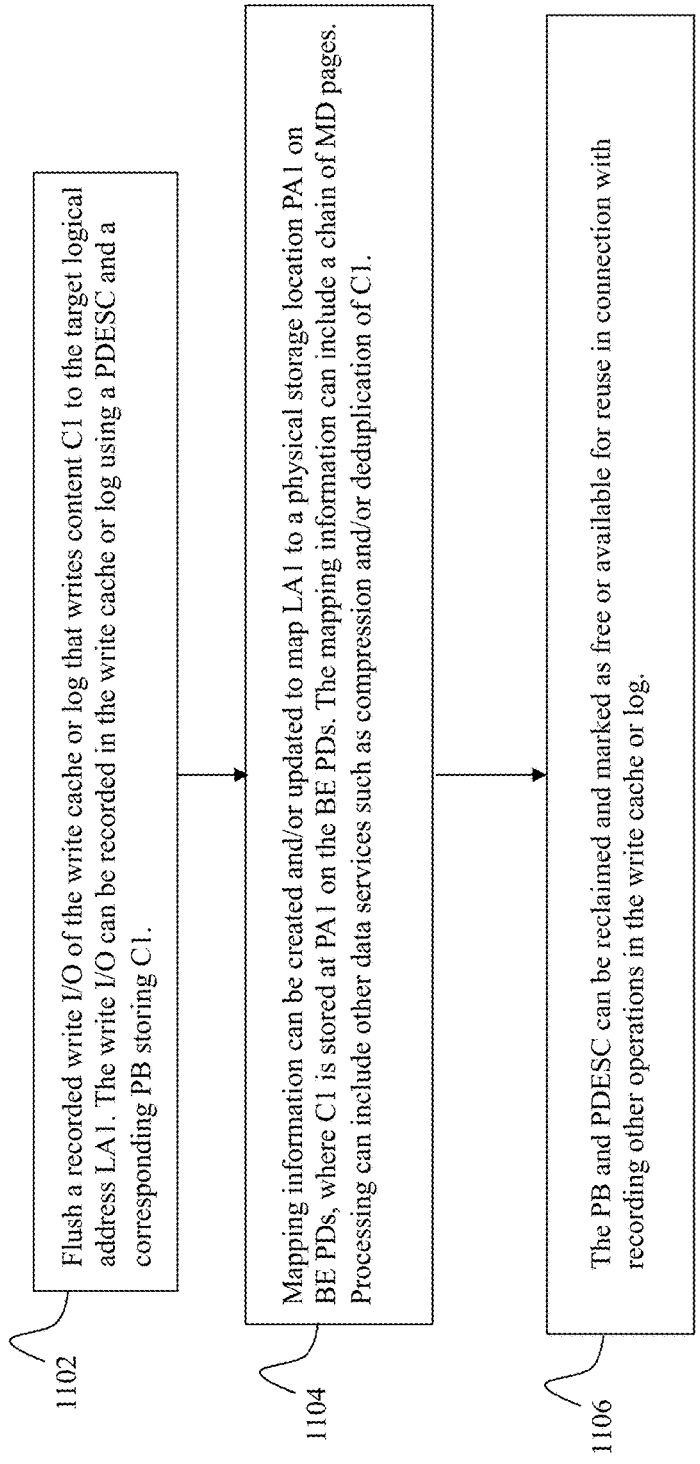

Referring to FIG. 12, shown is a flowchart 1100 of PB flush processing in at least one embodiment in accordance with the techniques of the present disclosure. The flowchart 1100 outlines processing performed in connection with flushing a write I/O recorded in the write cache or log with its corresponding write data or content stored in a PB of the PB pool in at least one embodiment.

At the step 1102, A recorded write I/O of the write cache or log can be flushed. The recorded write I/O can write content C1 to the target logical address LA1. The write I/O can be recorded in the write cache or log using a PDESC and corresponding PB of the PB pool storing C1. The subsequent steps 1104 and 1106 denote steps of PB flush processing when flushing the foregoing recorded write I/O from the write cache or log. From the step 1102, control proceeds to the step 1104.

At the step 1104, mapping information can be created and/or updated to map LA1 to a physical storage location PA1 on the BE PDs, where C1 is stored at PA1 on the BE PDs. The mapping information can include a chain of MD pages. Processing can include other data services such as compression and/or deduplication of C1. Depending on embodiment, the step 1104 can include allocating storage on the BE PDs at PA1 for storing C1 on the BE PDs, and then the mapping information can be updated to map LA1 to PA1. In at least one embodiment performing data deduplication where only a single unique instance of C1 can be stored on the BE PDs, such allocation of BE storage at PA1 can be performed if there is currently no existing instance of C1 on the BE PDs. As an alternative scenario, deduplication processing can determine that C1 of the write I/O is a duplicate of an existing instance of C1 already stored at PA1 on the BE PDs. In this case in at least one embodiment, the mapping information of LA1 can reference PA1 of the existing stored instance of C1 rather than allocate an additional new storage location. From the step 1104, control proceeds to the step 1106.

At the step 1106, processing can be performed to reclaim the PB and PDESC of the flushed write I/O, where the PB and PDESC reclaimed can be marked as free or available for reuse in connection with recording other operations in the write cache or log.

Figure 13:
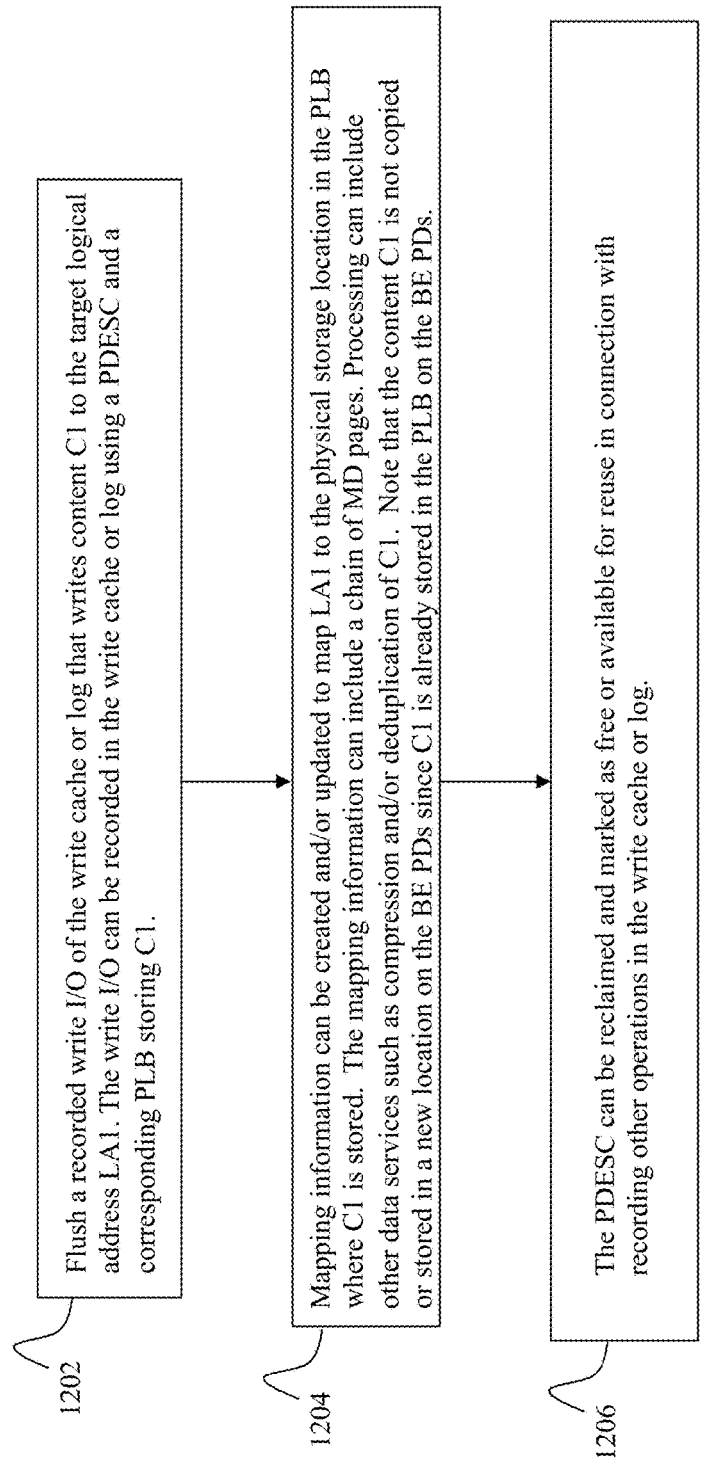

Referring to FIG. 13, shown is a flowchart 1200 of PLB flush processing in at least one embodiment in accordance with the techniques of the present disclosure. The flowchart 1200 outlines processing performed in connection with flushing a write I/O recorded in the write cache or log with its corresponding write data or content stored in a PLB of the PLB pool in at least one embodiment.

At the step 1202, A recorded write I/O of the write cache or log can be flushed. The recorded write I/O can write content C1 to the target logical address LA1. The write I/O can be recorded in the write cache or log using a PDESC and a corresponding PLB of the PLB pool storing C1. The subsequent steps 1204 and 1206 denote steps of PLB flush processing when flushing the foregoing recorded write I/O from the write cache or log. From the step 1202, control proceeds to the step 1204.

At the step 1204, mapping information can be created and/or updated to map LA1 to a physical storage location PA1 in the PLB of the PLB pool on the BE PDs, where C1 is stored at PA1 of the PLB on the BE PDs. The mapping information can include a chain of MD pages. Processing can include other data services such as compression and/or deduplication of C1. Note that content C1 in the step 1204 (as compared to the step 1104 of PB flush processing) is not copied or stored in a new location on the BE PDs since C1 is already stored in the PLB on the BE PDs. In this manner, PLB flush processing includes creating and/or updating the mapping information to map LA1 to PA1 denoting a storage location in the PLB without relocating, copying or moving C1 to a new BE PD location. From the step 1204, control proceeds to the step 1206.

At the step 1206, processing can be performed to reclaim the PDESC of the flushed write I/O, where the PDESC reclaimed can be marked as free or available for reuse in connection with recording other operations in the write cache or log. Note that in this case with PLB flush processing as compared to PB flush processing, there is no freeing or reclamation of a PB or storage location of C1.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer-implemented method comprising:
receiving a first set of write operations;
persistently recording, in a write cache or log, the first set of write operations, wherein said recording each write operation of the first set includes persistently recording information describing said each write operation in a corresponding page descriptor (PDESC) of a PDESC pool and persistently storing a corresponding write data page written by said each write operation in a corresponding page buffer (PB) of a PB pool;
selecting, in accordance with one or more criteria, a first plurality of write data pages stored in a first plurality of PBs of the PB pool for demotion to a first physical large block (PLB) of a PLB pool of non-volatile storage included in a storage tier of backend (BE) non-volatile storage, wherein each of the write data pages of the first plurality of write data pages selected denotes content written by a corresponding one of a first plurality of write operations of the first set;
responsive to said selecting, persistently storing the first plurality of write data pages from the first plurality of PBs of the PB pool in the first PLB; and
updating a first plurality of PDESCs associated with the first plurality of write data pages of the first plurality of write operations to reference corresponding storage locations in the first PLB rather than the first plurality of PBs.

2. The computer-implemented method of claim 1, wherein said selecting, said persistently storing and said updating are included in demotion processing performed responsive to detecting an occurrence of a trigger condition that triggers performance of said demotion processing.

3. The computer-implemented method of claim 2, wherein said trigger condition specifies to perform said demotion processing when a current utilization of PBs of the PB pool is above a specified threshold, or when a current level of free PBs of the PB pool is below a specified threshold.

4. The computer-implemented method of claim 3, wherein said demotion processing is repeated a plurality of times to demote content of PBs of the PB pool to PLBs of the PLB pool until a stop condition is met.

5. The computer-implemented method of claim 4, wherein the stop condition indicates to repeatedly perform said demotion processing until the current utilization of PBs of the PB pool is below a specified target level.

6. The computer-implemented method of claim 4, wherein the stop condition indicates to repeatedly perform said demotion processing until the current level of free PBs of the PB pool is above a specified target level.

7. The computer-implemented method of claim 1, wherein the one or more criteria includes a criterion that indicates to select for demotion from the PB pool to the PLB pool a set of write data pages stored in PBs of the PB pool, wherein each write data page of the set of write data pages corresponds to unreplicated write data of a storage object on a first system configured for replication to a second system.

8. The computer-implemented method of claim 7, wherein the storage object is any of a logical device, volume, file system, or file.

9. The computer-implemented method of claim 7, wherein the storage object is configured for asynchronous replication.

10. The computer-implemented method of claim 7, wherein the storage object is configured for semi-synchronous replication denoting a mode of asynchronous replication with a recovery point objective (RPO) less than a specified minimum.

11. The computer-implemented method of claim 7, further comprising:
replicating the set of write data pages demoted to the PLB pool; and
responsive to said replicating, performing processing including:
reclaiming one or more PLBs of the PLB pool storing the set of write data pages replicated; and
reclaiming PDESCs associated with the set of write data pages replicated by said replicating.

12. The computer-implemented method of claim 1, wherein the one or more criteria includes a criterion that indicates to select for demotion from the PB pool to the PLB pool a set of write data pages stored in PBs of the PB pool, wherein each write data page of the set of write data pages corresponds to write hot data associated with a corresponding target logical address that is overwritten at a frequency exceeding a specified threshold.

13. The computer-implemented method of claim 12, further comprising:
performing a write folding optimization of recorded write operations of the write cache or log, wherein said write folding optimization includes:
determining that a first write data page of the set corresponds to first content stored at a first logical address that is overwritten with second content of a second data page of the set; and
responsive to said determining that a first write data page of the set corresponds to first content stored at a first logical address that is overwritten with second content of a second data page of the set, reclaiming a first storage location in the PLB pool, wherein the first write data page that is overwritten is stored at the first storage location in the PLB pool.

14. The computer-implemented method of claim 1, wherein the PDESC pool and the PB pool are included in first non-volatile storage of the write cache or log, and wherein the PLB pool is included in an extension of the write cache or log included in the storage tier of BE non-volatile storage.

15. The computer-implemented method of claim 14, wherein the storage tier of BE non-volatile storage including the PLB pool has a first write latency that is greater than a second write latency of the first non-volatile storage including the PDESC pool and the PB pool.

16. The computer-implemented method of claim 1, further comprising:
marking the first plurality of PBs as free and available for reuse subsequent to said persistently storing the first plurality of write data pages from the first plurality of PBs of the PB pool in the first PLB.

17. One or more non-transitory computer readable media comprising code stored thereon that, when executed, performs a method comprising:
receiving a first set of write operations;
persistently recording, in a write cache or log, the first set of write operations, wherein said recording each write operation of the first set includes persistently recording information describing said each write operation in a corresponding page descriptor (PDESC) of a PDESC pool and persistently storing a corresponding write data page written by said each write operation in a corresponding page buffer (PB) of a PB pool;
selecting, in accordance with one or more criteria, a first plurality of write data pages stored in a first plurality of PBs of the PB pool for demotion to a first physical large block (PLB) of a PLB pool of non-volatile storage included in a storage tier of backend (BE) non-volatile storage, wherein each of the write data pages of the first plurality of write data pages selected denotes content written by a corresponding one of a first plurality of write operations of the first set;
responsive to said selecting, persistently storing the first plurality of write data pages from the first plurality of PBs of the PB pool in the first PLB; and
updating a first plurality of PDESCs associated with the first plurality of write data pages of the first plurality of write operations to reference corresponding storage locations in the first PLB rather than the first plurality of PBs.

18. The one or more non-transitory computer readable media of claim 17, wherein said selecting, said persistently storing and said updating are included in demotion processing performed responsive to detecting an occurrence of a trigger condition that triggers performance of said demotion processing.

19. The one or more non-transitory computer readable media of claim 18, wherein said trigger condition specifies to perform said demotion processing when a current utilization of PBs of the PB pool is above a specified threshold, or when a current level of free PBs of the PB pool is below a specified threshold.

20. A system comprising:
one or more processors; and
one or more memories comprising code stored thereon that, when executed, performs a method comprising:
receiving a first set of write operations;
persistently recording, in a write cache or log, the first set of write operations, wherein said recording each write operation of the first set includes persistently recording information describing said each write operation in a corresponding page descriptor (PDESC) of a PDESC pool and persistently storing a corresponding write data page written by said each write operation in a corresponding page buffer (PB) of a PB pool;
selecting, in accordance with one or more criteria, a first plurality of write data pages stored in a first plurality of PBs of the PB pool for demotion to a first physical large block (PLB) of a PLB pool of non-volatile storage included in a storage tier of backend (BE) non-volatile storage, wherein each of the write data pages of the first plurality of write data pages selected denotes content written by a corresponding one of a first plurality of write operations of the first set;
responsive to said selecting, persistently storing the first plurality of write data pages from the first plurality of PBs of the PB pool in the first PLB; and
updating a first plurality of PDESCs associated with the first plurality of write data pages of the first plurality of write operations to reference corresponding storage locations in the first PLB rather than the first plurality of PBs.

* * * * *